(12) United States Patent
Zhang et al.

(10) Patent No.: US 12,456,280 B2
(45) Date of Patent: Oct. 28, 2025

(54) FACIAL IMAGE PROCESSING METHOD AND DEVICE, TERMINAL, AND STORAGE MEDIUM

(71) Applicant: BEIJING BYTEDANCE NETWORK TECHNOLOGY CO., LTD., Beijing (CN)

(72) Inventors: Shupeng Zhang, Beijing (CN); Xijin Zhang, Beijing (CN); Ang Liu, Beijing (CN); Wei Zheng, Beijing (CN)

(73) Assignee: BEIJING BYTEDANCE NETWORK TECHNOLOGY CO., LTD., Beijing (CN)

( * ) Notice: Subject to any disclaimer, the term of this patent is extended or adjusted under 35 U.S.C. 154(b) by 626 days.

(21) Appl. No.: 17/631,891

(22) PCT Filed: Jul. 27, 2020

(86) PCT No.: PCT/CN2020/104949
§ 371 (c)(1),
(2) Date: Feb. 1, 2022

(87) PCT Pub. No.: WO2021/023047
PCT Pub. Date: Feb. 11, 2021

(65) Prior Publication Data
US 2022/0292875 A1    Sep. 15, 2022

(30) Foreign Application Priority Data

Aug. 6, 2019  (CN) .......................... 201910720752.8

(51) Int. Cl.
*G06V 10/75* (2022.01)
*G06V 10/94* (2022.01)
*G06V 40/16* (2022.01)

(52) U.S. Cl.
CPC ............ *G06V 10/751* (2022.01); *G06V 10/95* (2022.01); *G06V 40/162* (2022.01); *G06V 40/169* (2022.01); *G06V 40/172* (2022.01)

(58) Field of Classification Search
CPC .. G06V 40/172; G06V 10/761; G06V 40/168; G06V 20/40; G06V 20/46; G06V 40/162; G06T 2207/30201; G06F 18/22
See application file for complete search history.

(56) References Cited

U.S. PATENT DOCUMENTS 9,235,782 B1 * 1/2016 Zomet .................. G06V 40/171
9,554,111 B2 * 1/2017 Rav-Acha ................ H04N 9/87
(Continued)

FOREIGN PATENT DOCUMENTS

CN    105303151 A    2/2016
CN    107909539 A    4/2018
(Continued)

OTHER PUBLICATIONS

International Patent Application No. PCT/CN2020/104949; Int'l Search Report; dated Sep. 29, 2020; 2 pages.
(Continued)

*Primary Examiner* — Andrew M Moyer
*Assistant Examiner* — Ahmed A Nasher
(74) *Attorney, Agent, or Firm* — BakerHostetler

(57) ABSTRACT

Embodiments of the present application disclose a facial image processing method and device, a terminal, and a storage medium. The method comprises: in response to a split-screen instruction regarding a target video, displaying a video split-screen interface comprising at least a first display window and a second display window; in response to an image acquisition instruction, acquiring an image frame including at least a first face, wherein the first display window is used to display a video image frame including a
(Continued)

second face in the target video, and the second display window is used to display the image frame including at least the first face; obtaining, on the basis of the image frame including the first face and the video image frame including the second face, a similarity matching result between the first face and the second face; and displaying the similarity matching result in the video split-screen interface.

19 Claims, 21 Drawing Sheets

(56) References Cited

U.S. PATENT DOCUMENTS

| | | | |
|---|---|---|---|
| 11,057,444 B1* | 7/2021 | Sarkar | H04L 65/4015 |
| 11,212,331 B1* | 12/2021 | Gaiduchenko | H04L 65/762 |
| 2014/0204123 A1 | 7/2014 | Begeja et al. | |
| 2019/0205627 A1* | 7/2019 | De la Torre | G06V 40/172 |
| 2019/0318153 A1* | 10/2019 | Liu | G06V 10/454 |

FOREIGN PATENT DOCUMENTS

| | | |
|---|---|---|
| CN | 108875466 A | 11/2018 |
| CN | 109005352 A | 12/2018 |
| CN | 109819166 A | 5/2019 |
| CN | 110008797 A | 7/2019 |

OTHER PUBLICATIONS

Written Opinion for International Application No. PCT/CN2020/104949, mailed Sep. 29, 2020, 08 Pages.

* cited by examiner

FACIAL IMAGE PROCESSING METHOD AND DEVICE, TERMINAL, AND STORAGE MEDIUM

The present application is the national phase application of International Patent Application No. PCT/CN2020/104949, titled "FACIAL IMAGE PROCESSING METHOD AND DEVICE, TERMINAL, AND STORAGE MEDIUM", filed on Jul. 27, 2020, which claims priority to Chinese Patent Application No. 201910720752.8, titled "FACIAL IMAGE PROCESSING METHOD AND DEVICE, TERMINAL, AND STORAGE MEDIUM", filed on Aug. 6, 2019 with the National Intellectual Property Administration, PRC, both of which are incorporated herein by reference in their entireties.

FIELD

The present disclosure relates to the field of computer technologies, and in particular to a face image processing method and device, a terminal, and a storage medium.

BACKGROUND

With the increasing popularity of terminal devices such as smart phones and tablet computers, interactive applications based on terminal devices have become major ways for communication and entertainment. In conventional technologies, a user face may be recognized through an interactive application, and facial features of the user face may be detected. However, this detection method may only be used to determine whether the facial features of the user face are beautiful, which has a single application scenario, failing to satisfy diverse demands of users.

SUMMARY

In view of this, a face image processing method and device, a terminal, and a storage medium are provided according to embodiments of the present disclosure.

In the first aspect, a face image processing method is provided according to the embodiments of the present disclosure, including:
  presenting, in response to a duet instruction for a target video, a video duet interface including at least a first display window and a second display window;
  collecting, in response to an image collecting instruction, a frame image including at least a first face, where the first display window displays a video frame image of the target video including a second face, and the second display window displays the frame image including at least the first face;
  obtaining a similarity matching result of the first face and the second face based on the frame image including the first face and the video frame image including the second face; and
  presenting the similarity matching result in the video duet interface.

In the above solution, before the collecting, in response to an image collecting instruction, a frame image including at least a first face, the method further includes:
  receiving an operation instruction corresponding to a similarity effect; and
  loading, in response to the operation instruction, effect resources corresponding to the similarity effect, where the presenting the similarity matching result in the video duet interface includes:
  presenting, through the effect resources, the similarity matching result in the video duet interface.

In the above solution, the method further includes:
  presenting video information of at least one video in the user interface; and
  receiving, based on the presented video information of the at least one video, a video selecting instruction for the at least one video, and determining a video corresponding to the video selecting instruction as the target video.

In the above solution, the obtaining a similarity matching result of the first face and the second face includes:
  sending the collected frame image to a server, where the server performs, based on the frame image including the first face and the video frame image including the second face, similarity matching on the first face and the second face, to obtain the similarity matching result; and
  receiving the similarity matching result returned by the server.

In the above solution, the obtaining a similarity matching result of the first face and the second face includes:
  receiving a video file of the target video sent by a server;
  decoding the video file to obtain the video frame image including the second face; and
  performing, based on the frame image including the first face and the video frame image including the second face, similarity matching on the first face and the second face to obtain a similarity matching result.

In the above solution, the presenting the similarity matching result in the video duet interface includes:
  presenting, in the first display window and/or the second display window, an overall similarity matching result of facial features between the first face and the second face.

In the above solution, the presenting the similarity matching result in the video duet interface includes:
  presenting, in the first display window and/or the second display window, a content of a facial feature with a highest similarity between the first face and the second face.

In the above solution, the method further includes:
  obtaining, if it is recognized that the collected frame image includes multiple faces, recognition information corresponding to the multiple faces, where the recognition information includes at least one of the following: a recognition sequence of the multiple faces, and a face integrity of each of the recognized multiple faces; and
  determining, based on the recognition information, the first face from the multiple faces.

In the above solution, the presenting the similarity matching result in the video duet interface includes:
  obtaining multiple similarity matching results, where the multiple similarity matching results are obtained by performing, based on multiple consecutive frame images each including a first face and multiple consecutive video frame images each including a second face, similarity matching on the first face and the second face; and
  presenting, if it is determined that facial similarity conclusion represented by the multiple similarity matching results is consistent, the facial similarity conclusion in the video duet interface.

In the second aspect, a face image processing method is provided according to the embodiments of the present disclosure, including:

loading, in response to a touch operation corresponding to a similarity effect, effect resources corresponding to the similarity effect;

collecting, in response to an image collecting instruction, a frame image including at least a first face and a second face;

obtaining a similarity matching result of the first face and the second face based on the collected frame image including at least the first face and the second face; and presenting the similarity matching result through the effect resources.

In the above solution, before the loading, in response to a touch operation corresponding to a similarity effect, effect resources corresponding to the similarity effect, the method further includes:

presenting, in response to a duet instruction for a target video, a video duet interface including at least a first display window and a second display window, where the first display window displays a frame image included in the target video, and the second display window displays the collected frame image including at least the first face and the second face.

In the above solution, the obtaining a similarity matching result of the first face and the second face based on the collected frame image including at least the first face and the second face includes:

sending the collected frame image including at least the first face and the second face to a server, where the server performs, based on the frame image including at least the first face and the second face, similarity matching on the first face and the second face, to obtain the similarity matching result; and receiving the similarity matching result returned by the server.

In the above solution, the obtaining a similarity matching result of the first face and the second face based on the collected frame image including at least the first face and the second face includes:

performing, based on the collected frame image including at least the first face and the second face, similarity matching on the first face and the second face, to obtain the similarity matching result.

In a third aspect, a face image processing device is provided according to the embodiments of the present disclosure, including:

a first presenting unit, configured to present, in response to a duet instruction for a target video, a video duet interface including at least a first display window and a second display window;

a first collecting unit, configured to collect, in response to an image collecting instruction, a frame image including at least a first face, where the first display window is configured to display a video frame image of the target video including a second face, and the second display window is configured to display the frame image including at least the first face;

a first obtaining unit, configured to obtain a similarity matching result of the first face and the second face based on the frame image including the first face and the video frame image including the second face; and a second presenting unit, configured to present the similarity matching result in the video duet interface.

In the above solution, the device further includes a first loading unit. The first loading unit is configured to: receive an operation instruction corresponding to a similarity effect; and load, in response to the operation instruction, effect resources corresponding to the similarity effect. The second presenting unit is further configured to present, through the effect resources, the similarity matching result in the video duet interface.

In the above solution, the device further includes a selecting unit. The selecting unit is configured to present video information of at least one video in a user interface; and receive, based on the presented video information of the at least one video, a video selecting instruction for the at least one video, and determining a video corresponding to the video selecting instruction as the target video.

In the above solution, the first acquiring unit is further configured to: send the collected frame image to a server, where the server is configured to perform, based on the frame image including the first face and the video frame image including the second face, similarity matching on the first face and the second face, to obtain the similarity matching result; and receive the similarity matching result returned by the server.

In the above solution, the first obtaining unit is further configured to receive a video file of the target video sent by the server; decode the video file to obtain the video frame image including the second face; and perform, based on the frame image including the first face and the video frame image including the second face, similarity matching on the first face and the second face to obtain a similarity matching result.

In the above solution, the second presenting unit is further configured to present, in the first display window and/or the second display window, an overall similarity matching result of facial features between the first face and the second face.

In the above solution, the second presenting unit is further configured to present, in the first display window and/or the second display window, a facial feature with a highest similarity between the first face and the second face.

In the above solution, the device further includes a recognizing unit. The recognizing unit is configured to obtain, if it is recognized that the collected frame image includes multiple faces, recognition information corresponding to the multiple faces, where the recognition information includes at least one of the following: a recognition sequence of the multiple faces, and a face integrity of each of the recognized plurality of faces; and determine, based on the recognition information, the first face from the multiple faces.

In the above solution, the second presenting unit is further configured to obtain multiple similarity matching results, where the multiple similarity matching results are obtained by performing, based on multiple consecutive frame images each including a first face and multiple consecutive video frame images each including a second face, similarity matching on the first face and the second face; and present, if it is determined that facial similarity conclusion represented by the multiple similarity matching results is consistent, the facial similarity conclusion in the video duet interface.

In a fourth aspect, a face image processing device is provided according to the embodiments of the present disclosure, including:

a loading unit, configured to load, in response to a touch operation corresponding to a similarity effect, effect resources corresponding to the similarity effect;

a second collecting unit, configured to collect, in response to an image collecting instruction, a frame image including at least a first face and a second face;

a second obtaining unit, configured to obtain a similarity matching result of the first face and the second face based on the collected frame image including at least the first face and the second face; and a third presenting unit, configured to present the similarity matching result through the effect resources.

In the above solution, the device further includes a fourth presenting unit, and the fourth presenting unit is arranged in front of the loading unit. The fourth presenting unit is configured to present, in response to a duet instruction for a target video, a video duet interface including at least a first display window and a second display window. The first display window is configured to display a frame image included in the target video, and the second display window is configured to display the collected frame image including at least the first face and the second face.

In the above solution, the second obtaining unit is further configured to send the collected frame image including at least the first face and the second face to a server, where the server is configured to perform, based on the frame image including at least the first face and the second face, similarity matching on the first face and the second face, to obtain the similarity matching result; and receive the similarity matching result returned by the server.

In the above solution, the second obtaining unit is further configured to perform, based on the collected frame image including at least the first face and the second face, similarity matching on the first face and the second face, to obtain the similarity matching result.

In a fifth aspect, a terminal is provided according to the embodiments of the present disclosure, including:
- a first memory, configured to store executable instructions; and
- a first processor, configured to perform, when executing the executable instructions, the face image processing method according to the above embodiments of the present disclosure.

In a sixth aspect, a terminal is provided according to the embodiments of the present disclosure, including:
- a second memory, configured to store executable instructions; and
- a second processor, configured to perform, when executing the executable instructions, the face image processing method according to the above embodiments of the present disclosure.

In a seventh aspect, a non-transitory storage medium is provided according to the embodiments of the present disclosure, which stores executable instructions. The executable instructions, when executed, implement the face image processing method according to the embodiments of the present disclosure.

In an eighth aspect, a non-transitory storage medium is provided according to the embodiments of the present disclosure, which stores executable instructions. The executable instructions, when executed, implement the face image processing method according to the embodiments of the present disclosure.

The embodiments of the present disclosure can achieve the following beneficial effects. With the above embodiments of the present disclosure, the similarity matching result of the first face and the second face is obtained by performing similarity matching on the collected frame image including the first face and the video frame image including the second face in the target video, and the obtained similarity matching result is presented through the effect resources, thereby meeting the diverse demands of users, thus achieving a good user experience.

DETAILED DESCRIPTION OF EMBODIMENTS

Figure 1:
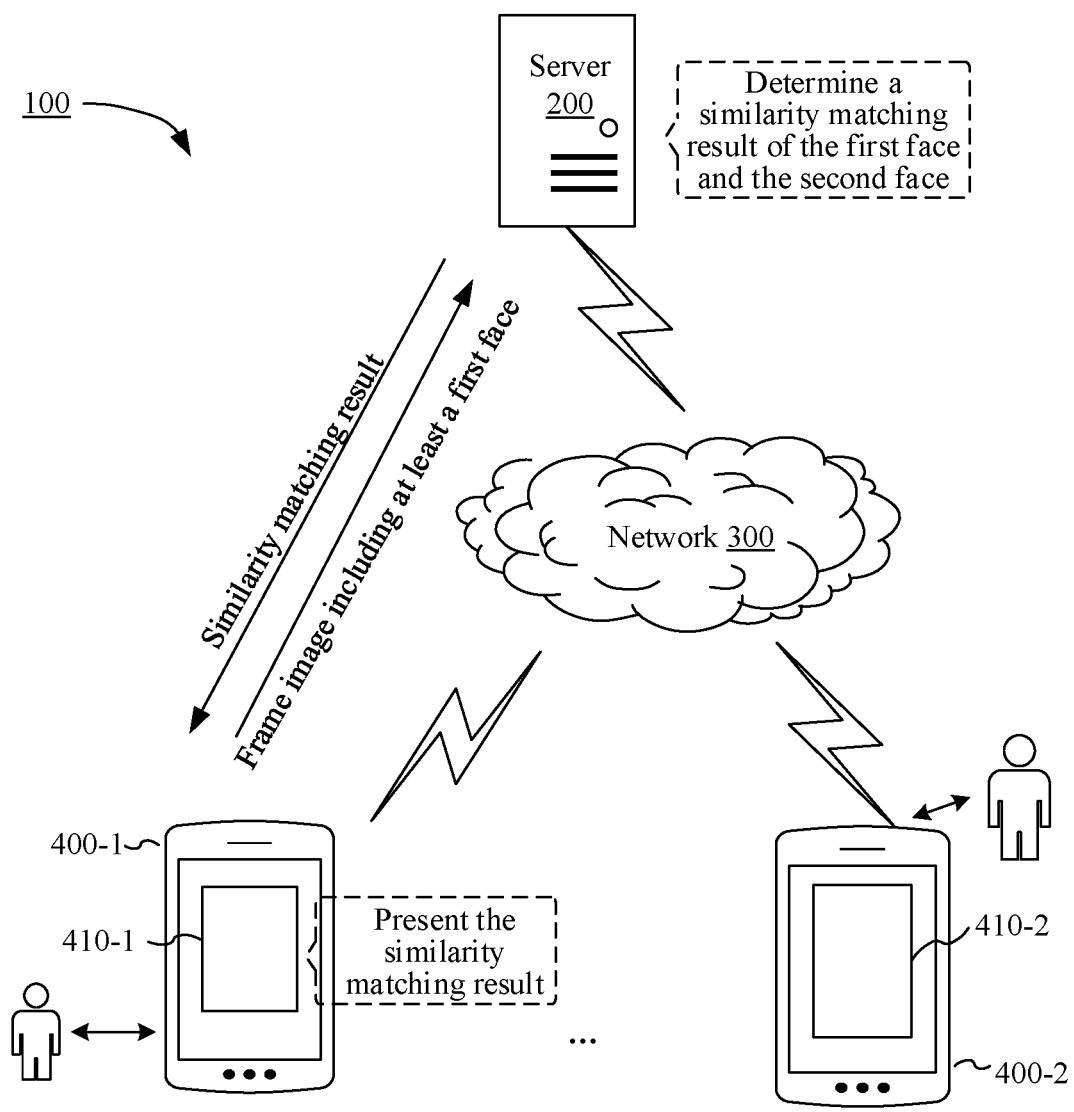
FIG. 1 is a schematic architectural diagram of a face image processing system according to an embodiment of the disclosure.

Hereinafter, embodiments of the present disclosure will be described in more detail with reference to the drawings. Although some embodiments of the present disclosure are shown in the drawings, it should be understood that the present disclosure may be implemented in various forms and should not be construed as being limited to the embodiments described herein. On the contrary, the embodiments are provided for a more thorough and complete understanding of the present disclosure. It should be understood that the drawings and embodiments of the present disclosure are only used for exemplary purposes, and are not used to limit the protection scope of the present disclosure.

It should be understood that the various steps in the method embodiments of the present disclosure may be executed in a different order, and/or executed in parallel. In addition, the method embodiments may include additional steps and/or omit the illustrated steps. The scope of the present disclosure is not limited in this respect.

The term "including" and its variants herein are non-inclusive, that is, "including but not limited to". The term "based on" means "based at least partially on". The term "an embodiment" means "at least one embodiment"; the term "another embodiment" means "at least one another embodiment"; the term "some embodiments" means "at least some embodiments." Related definitions of other terms will be given in the following description.

It should be noted that the concepts of "first" and "second" mentioned in the present disclosure are only used to distinguish different devices, modules or units, and are not used to limit the order of functions performed by these devices, modules or units, or interdependence of these devices.

It should be noted that the terms "a" and "a plurality of" mentioned in the present disclosure are illustrative and not restrictive, and those skilled in the art should understand that unless clearly indicated in the context, these terms should be understood as "one or more".

The names of information or messages communicated between multiple devices in the embodiments of the present disclosure are only used for illustrative purposes, and are not used to limit the scope of these messages or information.

Next, referring to FIG. 1, FIG. 1 is a schematic diagram of an architecture of a face image processing system according to an embodiment of the present disclosure. In an exemplary application, the terminal 400 includes a terminal 400-1 and a terminal 400-2, the terminal 400 is connected to a server 200 through a network 300, and the terminal is provided with a client through which the user may load prop resources. The network 300 may be a wide area network or a local area network, or a combination thereof, and may realize data transmission by using wireless links.

The terminal 400 (for example, the terminal 400-1) is configured to: present a video duet interface including at least a first display window and a second display window in response to a duet instruction for a target video; collect, in response to an image collecting instruction, a frame image including at least a first face, where the first display window is used to display a video frame image of the target video including a second face, and the second display window is used to display the frame image including at least the first face; and send the collected frame image including the first face to the server 200.

The server 200 is configured to perform similarity matching on the first face and the second face based on the received frame image including the first face and the frame image including the second face, to obtain a similarity matching result, and return the similarity matching result to the terminal 400. The terminal 400 presents the similarity matching result in the video duet interface. In this way, the similarity matching operation between the first face and the second face is performed by the server, which reduces the data processing load on the terminal side, and is suitable for a case that the collected frame image including the first face and the video frame image including the second face have large resolutions.

In some embodiments, the terminal 400 (for example, the terminal 400-1) is provided with a client. The terminal displays facial feature similarity matching results based on the client. The client presents, in response to the duet instruction for the target video, a video duet interface including at least a second display window and a second display window; collect, in response to an image collecting instruction, a frame image including at least a first face, where the first display window is used to display the frame image of the target video including a second face, and the second display window is used to display a frame image including at least the first face; obtain, based on the collected frame image including the first face and the frame image including the second face, a similarity matching result of the first face and the second face; and present the similarity matching result in the video duet interface. In this way, the similarity matching operation between the first face and the second face can be performed in real-time on the terminal side, thereby improving the efficiency of obtaining the similarity matching result, thus improving the user experience.

In some embodiments, the terminal 400 loads effect resources corresponding to a similarity effect in response to a touch operation corresponding to the similarity effect; collects a frame image including at least the first face and the second face in response to an image collecting instruction; and send the collected frame image to the server 200. The server 200 obtains the similarity matching result of the first face and the second face based on received frame image including at least the first face and the second face, and returns the similarity matching result to the terminal 400, so that the terminal 400 presents the similarity matching result through the effect resources. In this way, the similarity matching operation between the first face and the second face is performed by the server, which reduces the data processing loads on the terminal side, and is suitable for a case that the collected frame image including the first face and the video frame image including the second face have large resolutions.

In some embodiments, the terminal 400 loads effect resources corresponding to the similarity effect in response to a touch operation corresponding to the similarity effect; collect a frame image including at least the first face and the second face in response to an image collecting instruction; obtain the similarity matching result of the first face and the second face based on the received frame image including at least the first face and the second face, and present the similarity matching result through the effect resources. In this way, the similarity matching operation between the first face and the second face can be performed in real time on the terminal side, thereby improving the efficiency of obtaining the similarity matching result, thus improving the user experience.

Figure 2:
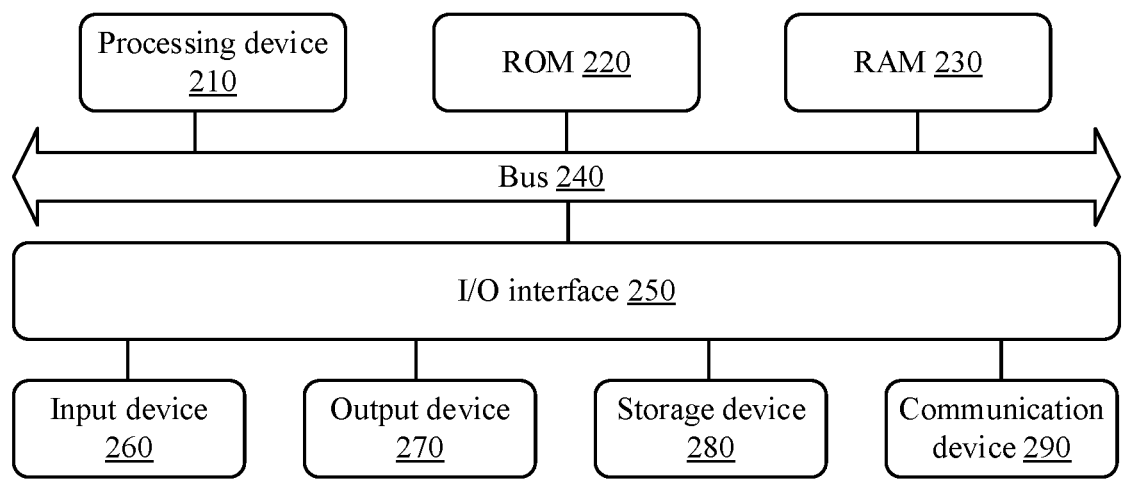
FIG. 2 is a schematic structural diagram of a face image processing device according to an embodiment of the disclosure.

Next, referring to FIG. 2, FIG. 2 is a schematic structural diagram of a face image processing device 200 according to an embodiment of the present disclosure. Electronic devices may be various terminals, including mobile terminals such as mobile phones, laptops, digital broadcast receivers, personal digital assistants (PDAs), tablet computers (PADs), portable multimedia players (PMI's), and in-car terminals (such as car navigation terminals), and fixed terminals such as digital televisions (TVs), desktop computers. The electronic device shown in FIG. 2 is only an example, and should not form any limitation to the function and scope of use of the embodiments of the present disclosure.

As shown in FIG. 2, the face image processing device may include a processing device (such as a central processing unit, a graphics processor) 210, which may execute various appropriate actions and processing based on a program stored in a read-only memory (ROM) 220 or a program loaded from a storage device 280 to a random access memory (RAM) 230. In the RAM 230, various programs and data required for the operation of the electronic device on face images are also stored. The processing device 210, the ROM 220, and the RAM 230 are connected to each other through a bus 240. An input/output (I/O) interface 250 is also connected to the bus 240.

Generally, the I/O interface 250 may be connected with the following devices, including an input device 260 such as a touch screen, a touch pad, a keyboard, a mouse, a camera, a microphone, an accelerometer, a gyroscope; an output device 270 such as a liquid crystal display (LCD), a speaker, a vibrator; a storage device 280 such as a magnetic tape, a hard disk; and a communication device 290. The communication device 290 may allow the face image processing device to perform wireless or wired communication with other devices to exchange data. Although FIG. 2 shows that the face image processing device includes various devices, it should be understood that it is unnecessary to implement or include all the devices shown, alternatively, more or fewer devices may be implemented or included.

In particular, according to an embodiment of the present disclosure, the process described in flowchart may be implemented as a computer software program. For example, in an embodiment of the present disclosure, a computer program product is provided, which includes a computer program carried on a computer-readable medium, and the computer program includes program codes for executing the method shown in the flowchart. In the embodiment, the computer program may be downloaded and installed from the network through the communication device 290, or installed from the storage device 280, or installed from the ROM 220. When the computer program is executed by the processing device 210, the above functions of the face image processing method in the embodiment of the present disclosure are executed.

It should be noted that the above computer-readable medium in the embodiments of the present disclosure may be a computer-readable signal medium or a computer-readable storage medium, or any combination thereof. The computer-readable storage medium may include, but is not limited to, an electrical, magnetic, optical, electromagnetic, infrared, or semiconductor system, apparatus, or device, or any combination thereof, for example. More specific examples of computer-readable storage medium may include, but are not limited to: an electrical connection with one or more wires, a portable computer disk, a hard disk, an RAM, an ROM, and an Erasable Programmable Read-Only Memory (EPROM), a flash memory, an optical fiber, a portable compact disk read-only memory (CD-ROM), an optical storage device, a magnetic storage device, or any suitable combination thereof.

In the embodiment of the present disclosure, the computer-readable storage medium may be any tangible medium that includes or stores a program, and the program may be used by or in combination with an instruction execution system, device, or device. In the embodiment of the present disclosure, the computer-readable signal medium may include a data signal propagated in a baseband or as a part of a carrier wave, and carries a computer-readable program code. The propagated data signal may have many forms, including but not limited to electromagnetic signals, optical signals, or any suitable combination thereof. The computer-readable signal medium may also be any computer-readable medium other than the computer-readable storage medium, and the computer-readable signal medium may send, propagate, or transmit a program for use by or in combination with the instruction execution system, device, or device. The program code included on the computer-readable medium may be transmitted by any suitable medium, including wires, optical cables, radio frequency (RF), or any suitable combination thereof.

The above computer-readable medium may be included in the above face image processing device; or may exist independently without being assembled into the face image processing device.

The above computer-readable medium carries one or more programs. The one or more programs, when are executed by the face image processing device, cause the face image processing device to execute the face image processing method according to the embodiments of the present disclosure.

The computer program code used to perform the operations in the embodiments of the present disclosure may be written in one or more programming languages or a combination thereof. The above programming languages include object-oriented programming languages, such as Java, Smalltalk, C++, and conventional procedural programming languages, such as "C" language or similar programming languages. The program code may be executed entirely on the user's computer, partly on the user's computer, executed as an independent software package, partly on the user's computer and partly executed on a remote computer, or entirely executed on the remote computer or server. In the case of a remote computer, the remote computer may be connected to the user's computer through any kind of networks, including a local area network (LAN) and a wide area network (WAN), or the remote computer may be connected to an external computer (for example, via the Internet by using an Internet service provider).

The units and/or modules in the embodiments of the present disclosure may be implemented in software or hardware.

In terms of hardware, the units and/or modules that implement the terminal of the embodiments of the present disclosure may be implemented by one or more application specific integrated circuits (ASIC), DSPs, programmable logic devices (PLDs), Complex Programmable Logic Device (CPLDs), Field-Programmable Gate Array (FPGA) or other electronic elements, to implement the online document processing method according to the embodiments of the present disclosure.

Figure 3:
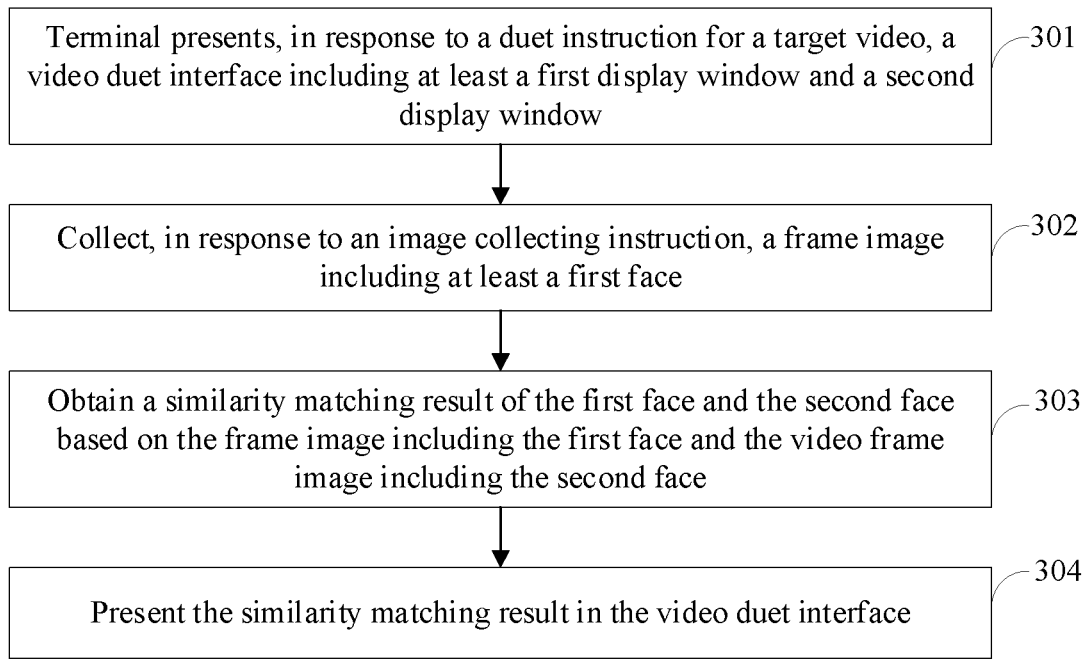
FIG. 3 is a schematic flowchart of a face image processing method according to an embodiment of the disclosure.

FIG. 3 is a schematic flowchart of a face image processing method according to an embodiment of the present disclosure. Referring to FIG. 3, the face image processing method according to an embodiment of the present disclosure includes the following steps 301 to 304.

In step 301, in response to a duet instruction for a target video, a terminal presents a video duet interface including at least a first display window and a second display window.

In practice, the terminal is provided with clients, such as an instant messaging client, a Weibo client, a short video client. The user may realize social interaction by loading prop resources on the client. The prop resources include at least one of the following: image props, audio props, user interface (UI) animation props. The image props may be scan boxes presented on the client or a web page, the audio props may be background music, and the UI animation may be an interface for network interaction.

In an actual implementation, a user may select a target video that he wants to duet with on the client of the terminal.

For example, in a feed stream or a topic video, the user may select any video with faces for duet. In some embodiments, the terminal may obtain the target video in the following manner:

presenting video information of at least one video in a user interface; receiving, based on the presented video information of the at least one video, a video selecting instruction for the video; and determining a video corresponding to the video selecting instruction as the target video.

Herein, the video information may include, for example, video cover information, text information associated with the video, such as a title, a video tag.

Figure 4A:
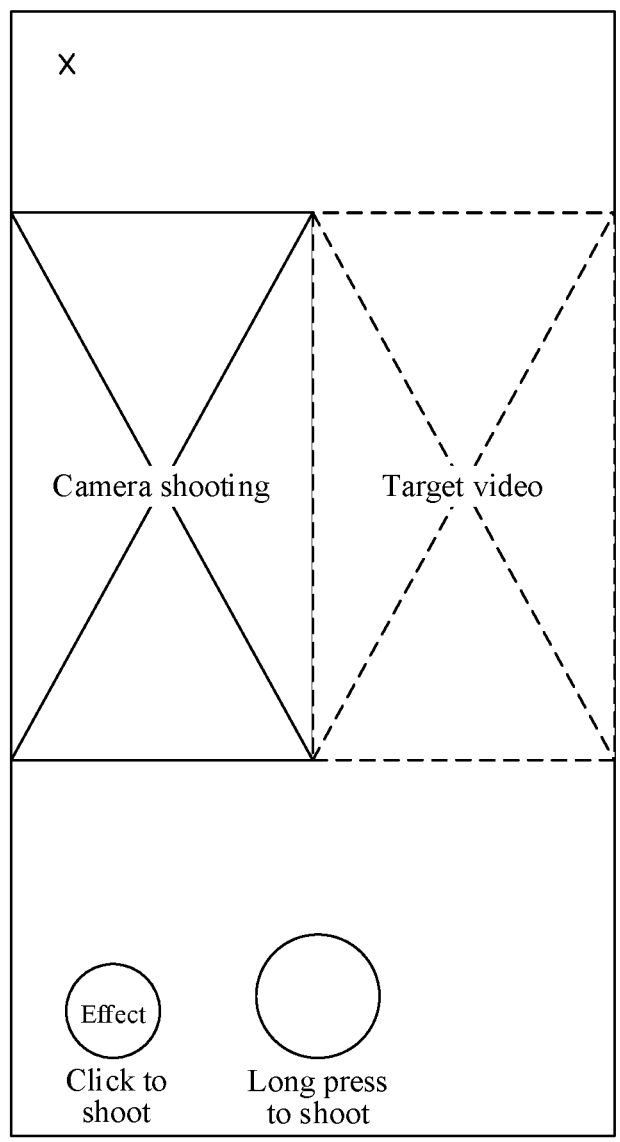
FIG. 4A is a schematic diagram of a video duet interface according to an embodiment of the present disclosure.

Referring to FIG. 4A, FIG. 4A is a schematic diagram of a video duet interface according to an embodiment of the present disclosure. When the user touches a duet button for a target video, a corresponding duet instruction is triggered. The terminal receives the duet instruction, and presents a video duet interface including a first display window, a second display window, effects and a shooting button. The first display window displays a video shot by a camera of the terminal device, and the second display window displays the target video selected by the user. Clicking the effect button may trigger the loading of effect resources, long pressing the shooting button may trigger the camera to shoot the video.

Figure 4B:
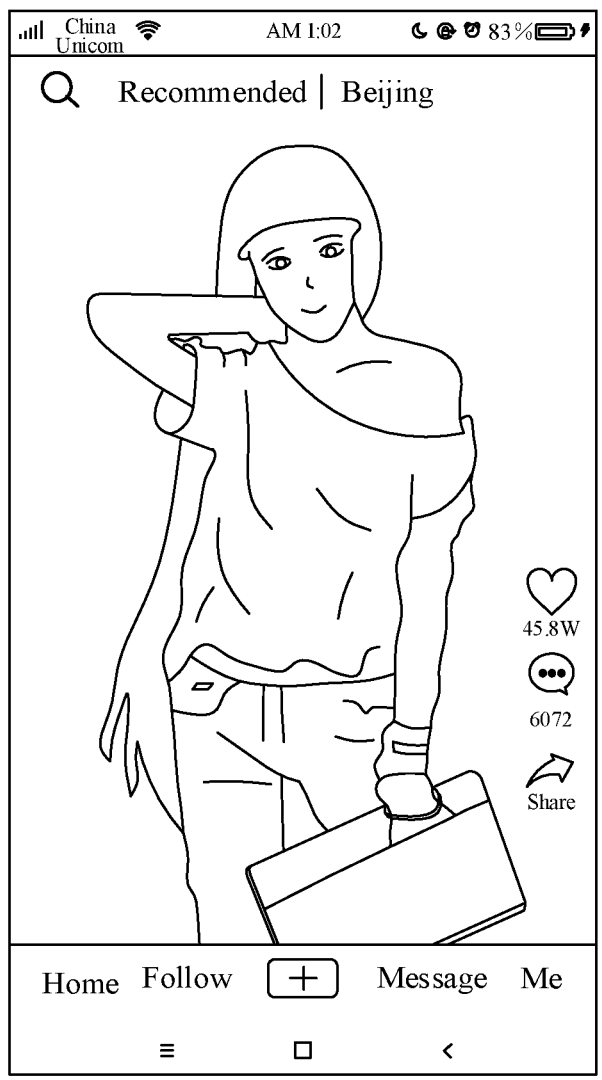
FIG. 4B is a schematic diagram of a video duet interface according to an embodiment of the present disclosure.
Figure 4C:
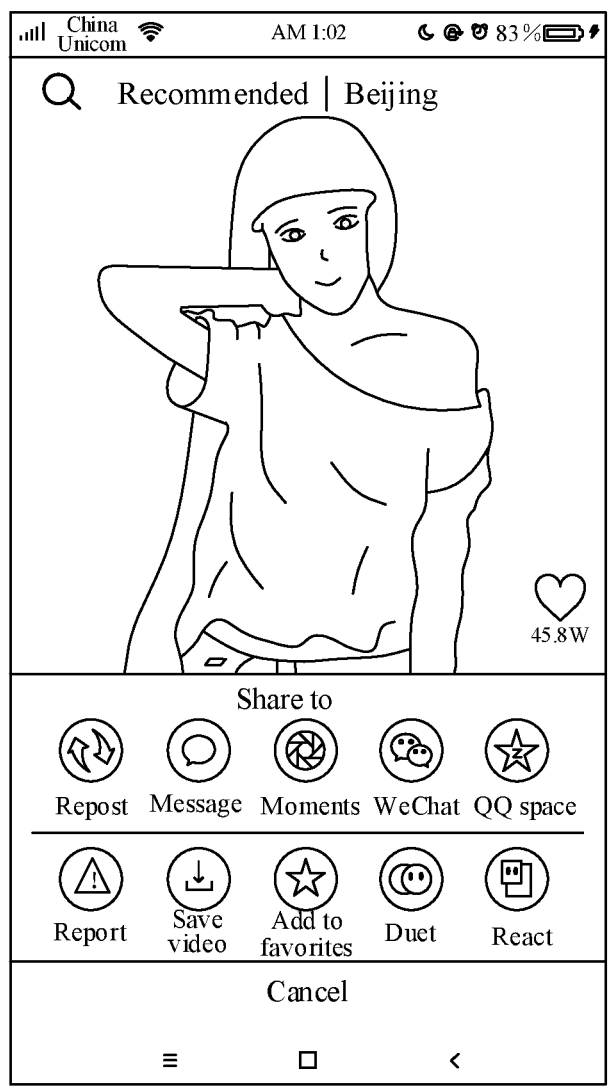
FIG. 4C is a schematic diagram of a video duet interface according to an embodiment of the present disclosure.
Figure 4D:
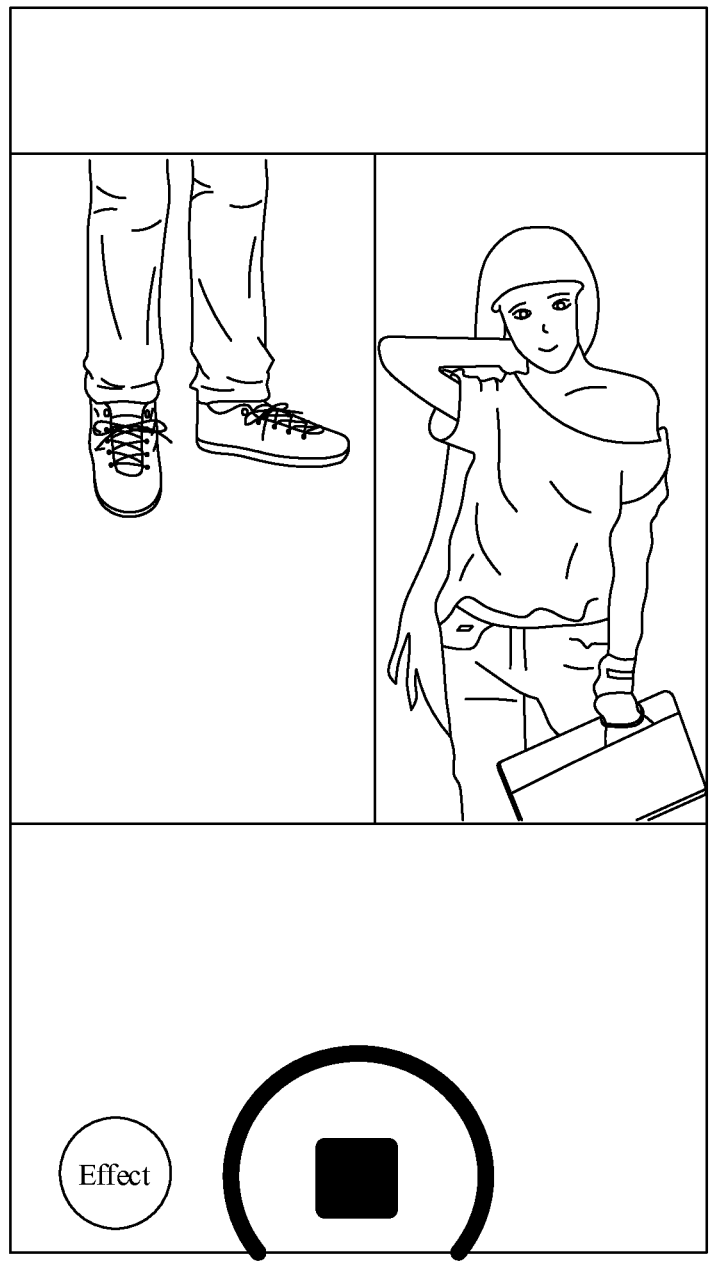
FIG. 4D is a schematic diagram of a video duet interface according to an embodiment of the disclosure.

In some embodiments, a short video client is installed on the terminal, and when the target video selected by the user is presented on the user interface of the short video client, the user may trigger the duet instruction by touching a button on the user interface, the terminal receives the duet instruction and displays the video duet interface. Referring to FIGS. 4B to 4D, FIGS. 4B to 4D are schematic diagrams of the video duet interface according to the embodiments of the disclosure. In FIG. 4B, when the user touches a button "share" on the user interface that presents the target video, the short video client presents a user interface as shown in FIG. 4C. There are multiple buttons on the user interface, such as repost, save video, add to favorites, and duet, and touching different buttons may trigger different sharing manners. When the button "duet" on the user interface as shown in FIG. 4C is touched, the video duet interface as shown in FIG. 4D may be loaded. The video duet interface in FIG. 4D has two display windows, an effect button and a shooting button, one of the display windows is used to display the target video, and the other one of the display windows is used to display the shot video. Clicking the effect button may trigger the loading of effect resources, and long pressing the shooting button may trigger the camera to shoot the video.

In practice, an effect library of the terminal stores a variety of effect types, such as big head, ancient identity test, most beautiful facial feature detection, and similarity detection. The user may select a desired effect type. In some embodiments based on a selecting operation of a user, the terminal may load the similarity effect resources in the following manner: receiving an operation instruction corresponding to a similarity effect; and loading, in response to the operation instruction, the effect resources corresponding to the similarity effect.

Figure 4E:
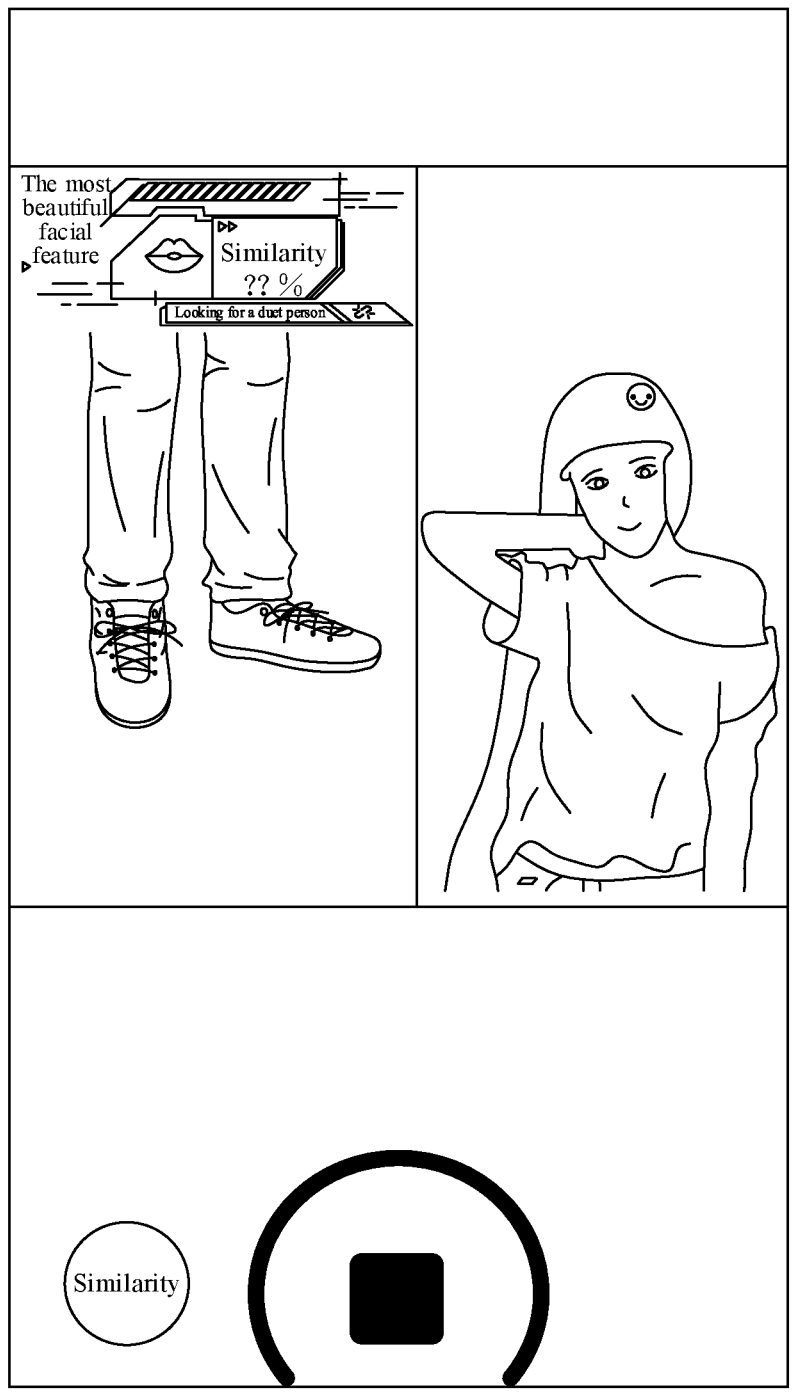
FIG. 4E is a schematic diagram of a video duet interface according to an embodiment of the disclosure.

For example, on the user interface shown in FIG. 4D, the user clicks on the button "effect" to select a similarity effect from a feature library, and the terminal receives an operation instruction triggered based on the touch operation of the user on the similarity effect, and loads the similarity effect resources corresponding to similarity effect. Referring to FIG. 4E, FIG. 4E is a schematic diagram of a video duet interface according to an embodiment of the present disclosure, the effect button of "similarity" is displayed on the user interface as shown in FIG. 4E.

In step 302, in response to an image collecting instruction, a frame image including at least the first face is obtained.

In an actual implementation, the user triggers a shooting button on the user interface to trigger the terminal to shoot a video, and the terminal collects frame images each including at least the first face in real time.

In step 303, based on the frame image including the first face and the video frame image including the second face, the similarity matching result of the first face and the second face is obtained.

In practice, when the terminal recognizes that the collected frame image includes multiple faces, the terminal obtains recognition information corresponding to the multiple faces, and determines the first face from the multiple faces based on the recognition information. The recognition information includes at least one of the following: a recognition sequence of the multiple faces, and a face integrity of the recognized multiple faces. When the video frame image of the target video includes multiple faces, the server may determine a second face from the multiple faces based on an appearing order of the multiple faces in the target video.

In some embodiments, the terminal may obtain the similarity matching result of the first face and the second face in the following manner:

sending the collected frame image to a server, so that the server can perform similarity matching on the first face and the second face based on the frame image including the first face and the video frame image including the second face, to obtain a similarity matching result; and receiving the similarity matching result returned by the server.

In an actual implementation, the terminal sends the collected frame image including the first face to the server. Since the target video is stored in the server, the server may extract, from the target video, a video frame image including a second face at the same time as the collected frame image. Then, the frame image including the first face and the video frame image including the second face are inputted into a trained neural network model, to perform face detection on the frame image including the first face and the frame image including the second face, to obtain the first face image and the second face image. Then, facial feature extraction is performed on the first face image and the second face image, to obtain facial features of the first face image and facial features of the second face image. Finally, similarity matching is performed on the facial features of the first face image and the facial features of the second face image, to obtain the similarity matching result, and the similarity matching result is returned to the terminal. In this way, the similarity matching operation between the first face and the second face is performed by the server, which reduces the data processing load on the terminal side, and is suitable for a case that the collected frame image including the first face and the video frame image including the second face have large resolutions.

In some embodiments, the terminal may also obtain the similarity matching result of the first face and the second face in the following manner:

receiving a video file of the target video sent by the server; decoding the video file to obtain the video frame image including the second face; performing, based on the frame image including the first face and the video frame image including the second face, similarity matching on the first face and the second face, to obtain a similarity matching result.

In an actual implementation, the server sends the stored target video file to the terminal. The terminal first obtains a video frame image including the second face based on the received target video file by suing the a decoder, and then inputs the collected frame including the first face and the video frame image including the second face into the trained neural network model, to perform face detection on the frame image including the first face and the frame image including the second face, to obtain the corresponding first face image and second face image. Facial feature exaction is performed on the first face image and the second face image, to obtain the facial features of the first face image and the facial features of the second face image. Finally, similarity matching is performed on the facial features of the first face image and the facial features of the second face image, to determine a similarity matching result of the first face and the second face. In this way, the similarity matching operation between the first face and the second face can be performed in real time on the terminal side, thereby improving the efficiency of obtaining the similarity matching result, thus improving the user experience.

It should be noted that during the duet process, if the user does not use the effect "similarity", the terminal may shoot according to a general duet function without triggering similarity detection. If the user uses the effect "similarity", while no face appears in the display window of the video duet interface, if no face appears in the first display window and/or no face appears in the second display window, the terminal may shoot according to the general duet function without triggering similarity detection. Referring to FIG. 4E, although the user uses the effect "similarity" and a face appears in the second display window, there is no face in the first display window, and the frame image including the first face cannot be collected, the terminal may shoot according to a general duet function without triggering similarity detection.

In addition, if there are effects that affect face detection in the video frame image including the second face in the target video, such as a headgear, the terminal may also shoot according to a general duet function without triggering similarity detection. If the user first initiates duet is a single person, and when there are multiple persons appear during the shooting, the shooting may be performed according to a single-person logic by default. In the single-person shooting process, if the user leaves and another face appears, a result may be obtained in real time on another face. In the single-person shooting process, if the face is not displayed, the similarity detection is not triggered.

In step 304, the similarity matching result is presented in the video duet interface.

In some embodiments, the terminal may present the similarity matching result in the following manner:
   presenting, in the first display window and/or the second display window, an overall similarity matching result of facial features between the first face and the second face.

Figure 5A:
FIG. 5A is a schematic diagram of an interface for presenting a face similarity matching result according to an embodiment of the disclosure; Figure

In an actual implementation, through step 303, the similarity result of the facial features of the first face and the second face is obtained. Based on the similarity result of the facial features and certain preset rules, the overall similarity result of the facial features is obtained. In addition, in some other embodiments, the most beautiful facial feature of the first face in the collected frame image may also be presented. Referring to FIG. 5A, FIG. 5A is a schematic diagram of an interface for presenting the face similarity matching result according to the embodiment of the present disclosure. In FIG. 5A, through effects resources, the display window of the video duet interface presents that the similarity between the first face and the second face is 90%, and the most beautiful facial feature of the first face is the mouth.

In some embodiments, the terminal may also present the similarity matching result in the following manner: presenting, in the first display window and/or the second display window, a most similar facial feature of the first face and the second face. In this way, the facial feature with the highest similarity to the matching object in the target video is displayed to the user, to provide the user with a reference for makeup or beautification, improving the user experience.

Figure 5B:
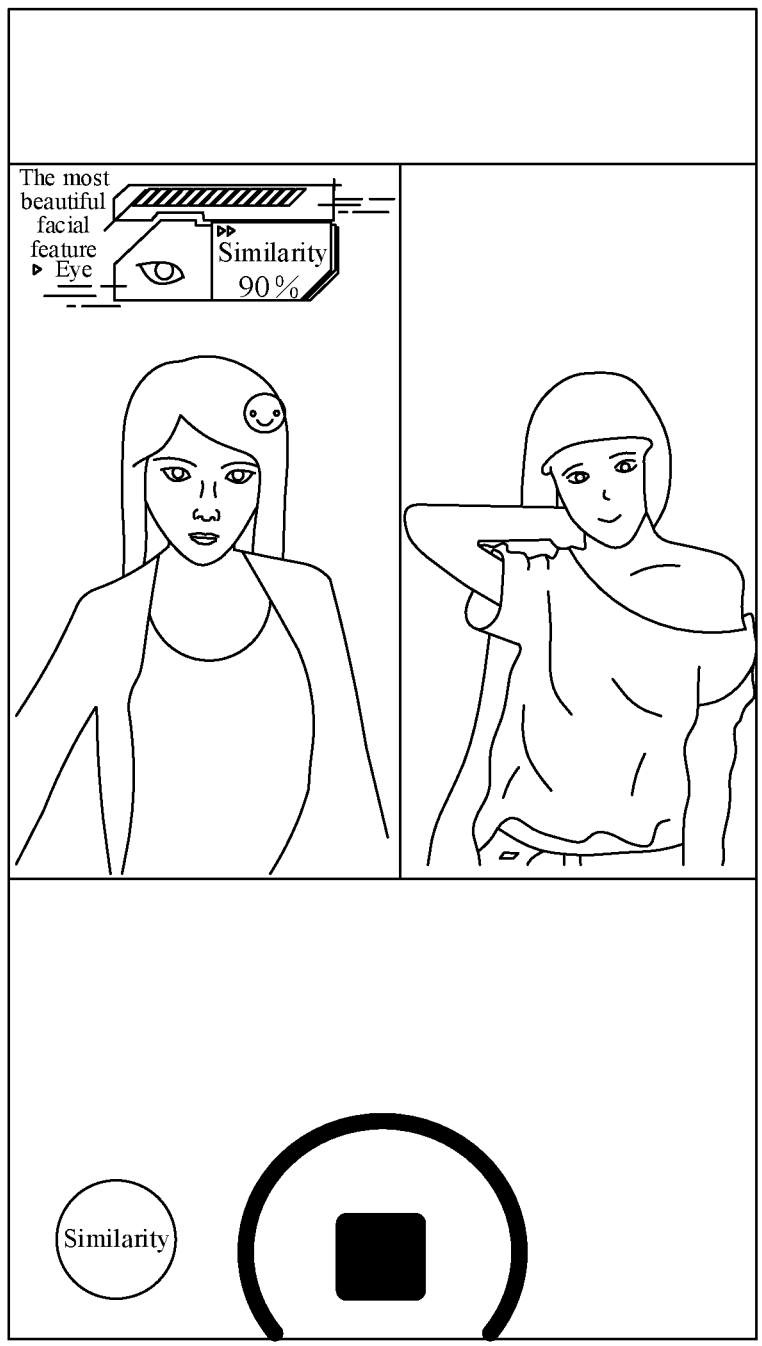
FIG. 5B is a schematic diagram of an interface for presenting a face similarity matching result according to an embodiment of the present disclosure.

Herein, in an actual implementation, the terminal determines the degree of similarity of the corresponding parts according to the obtained similarity of the facial features of the first face and the second face. For example, the similarities of the corresponding eyebrows, mouth, eyes, nose, and ears in the first face and the second face are: 80%, 65%, 90%, 70%, 60%, it may be determined that the most similar facial feature of the first face and the second face are eyes. Referring to FIG. 5B, FIG. 5B is a schematic diagram of an interface for presenting a face similarity matching result according to an embodiment of the present disclosure. In FIG. 5B, the display window of the video duet interface presents that the most similar facial feature is the eye, and the similarity is 90%.

Figure 5C:
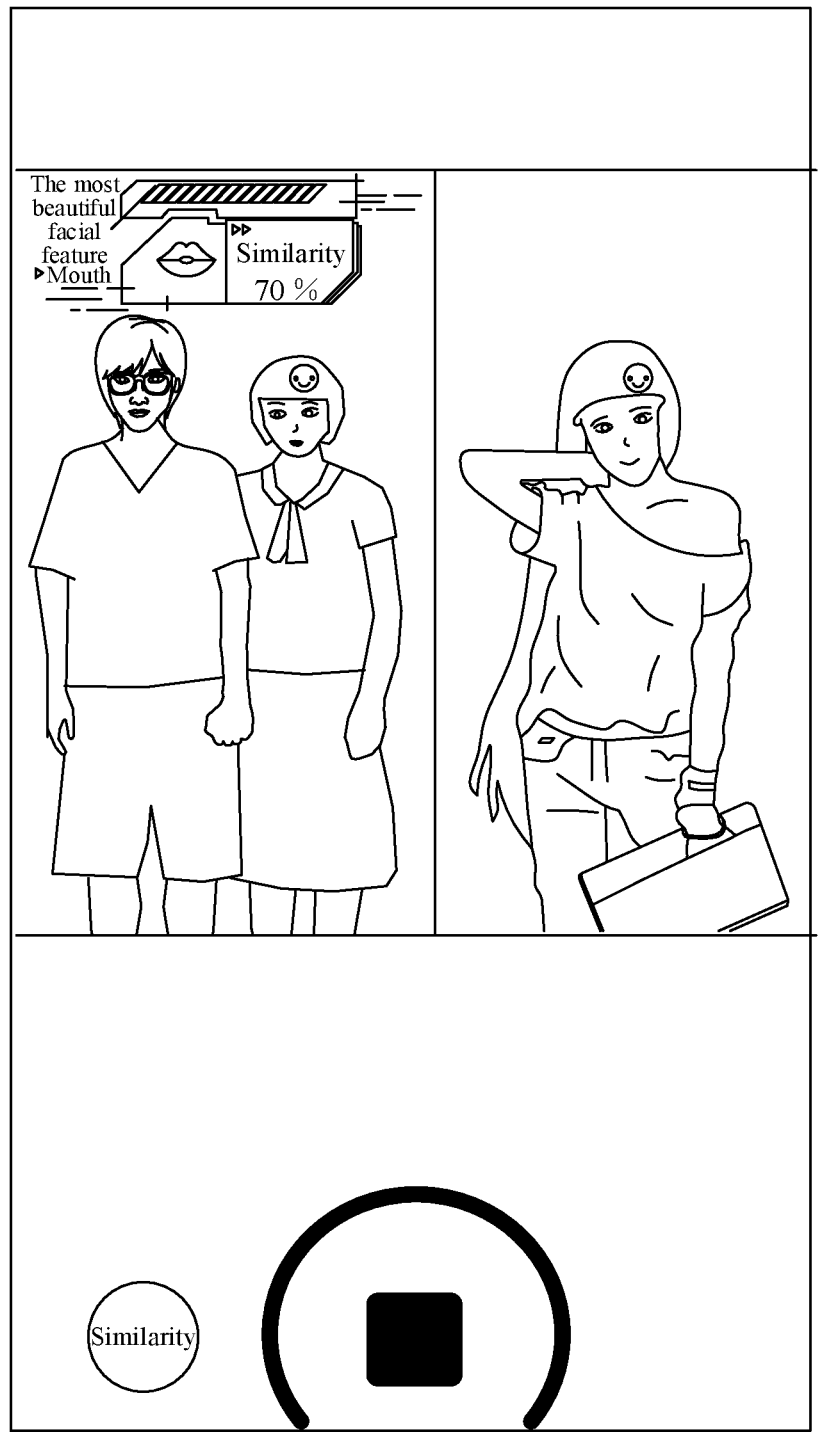
FIG. 5C is a schematic diagram of an interface for presenting a face similarity matching result according to an embodiment of the present disclosure.

In some embodiments, when the terminal recognizes that the collected frame image includes multiple faces, referring to FIG. 5C, FIG. 5C is a schematic diagram of an interface for presenting a face similarity matching result according to an embodiment of the present disclosure. A video shot by a camera presented in a first display window of the video duet interface as shown in FIG. 5C includes two faces, that is, when the terminal recognizes that the collected frame image includes two faces, based on the recognition order of the two faces, a female face that is recognized first is determined as the first face, and a smiley face tag is presented in a corresponding female face area. The display window of the video duet interface presents that the similarity between the first face and the second face is 90%, and the most beautiful facial feature on the face is the mouth.

Figure 5D:
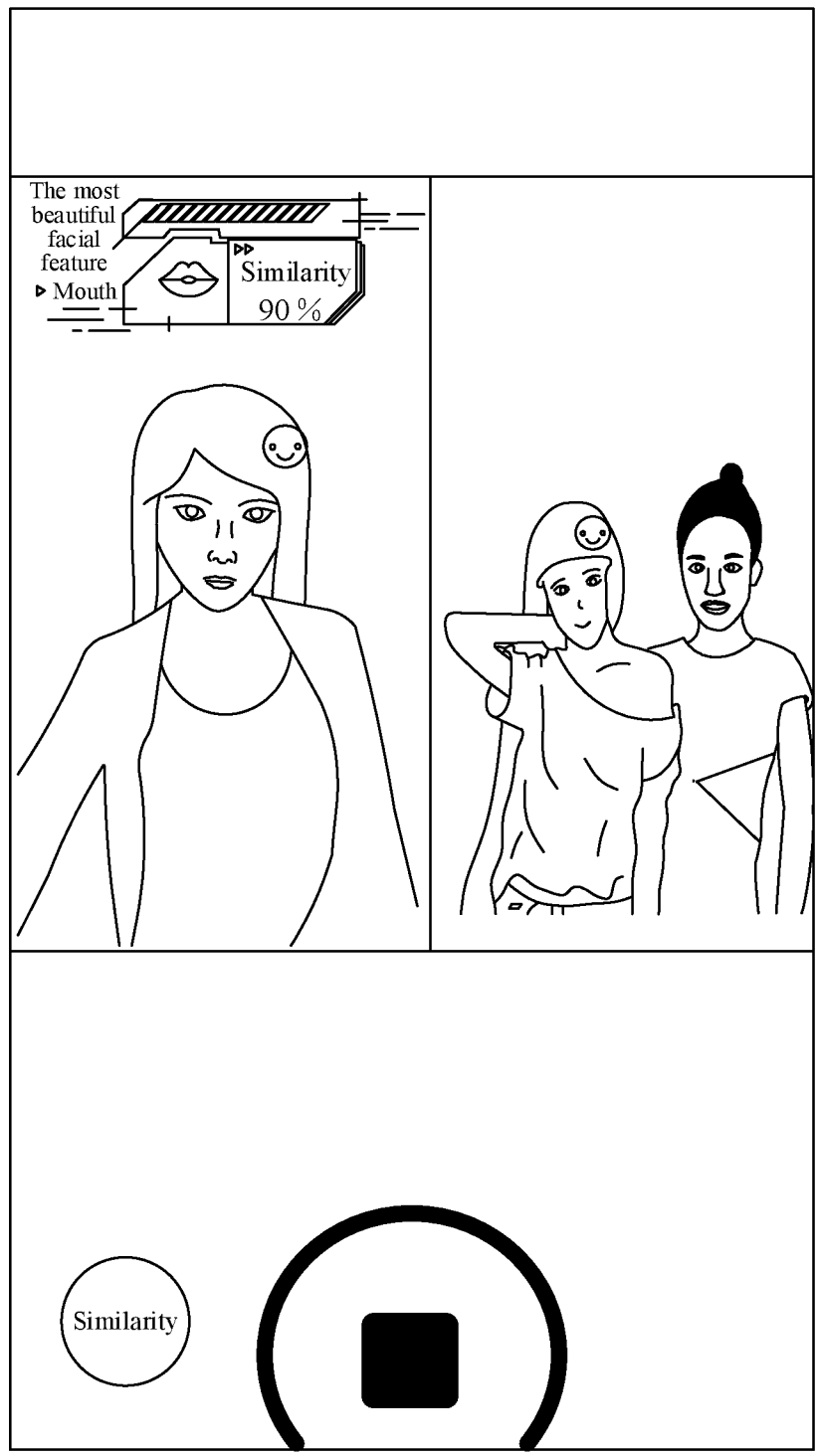
FIG. 5D is a schematic diagram of an interface for presenting a face similarity matching result according to an embodiment of the disclosure.

In some embodiments, when the video frame image of the target video includes multiple faces, refer to FIG. 5D. FIG. 5D is a schematic diagram of the interface for presenting the face similarity matching results according to the embodiments of the present disclosure. The video frame image of the target video presented in the second display window of the video duet interface includes two faces. The server determines the second face from the two faces based on the appearing order of the two faces, and presents a smiley face tag at a selected corresponding face area. Through effect resources, the display window of the video duet interface presents that the similarity between the first face and the second face is 90%, and the most beautiful facial feature of the first face is the mouth.

It should be noted that whether the terminal recognizes that the collected frame image includes multiple faces, or the video frame image of the target video includes multiple faces, or the terminal recognizes that the collected frame image and the video frame image of the target video each includes multiple faces, the first face and the second face can be determined from multiple faces based on the recognition order of multiple faces, the face integrity of the multiple faces and other recognition information. That is, in some embodiments, the first face is determined from the collected frame image including multiple faces, and the second face is determined from the video frame image including multiple faces of the target video. In some other embodiments, the first face and the second face are determined from the collected frame image including multiple faces. In some other embodiments, the first face and the second face are determined from the video frame image including multiple faces of the target video. The similarity result of the first face and the second face presented, through effect resources, in the display window of the video duet interface is determined by, but not limited to, the above manners.

In practice, when the user presents the facial similarity conclusion on the client of a terminal, the following scenario may exist. For a user who initiates a duet, similarity matching is performed on a frame image including a first face and a video frame image including a second face, and the presented similarity of the first face and the second face is 50%, However, since the collected image is not accurate enough due to the user's movement, when similarity matching is performed on a next frame image including a first face and a video frame image including a second face that are collected continuously, the presented similarity of the first face and the second face is 20%. For this application scenario, in some embodiments, the terminal may also present the similarity matching result in the video duet interface in the following manner:

obtaining multiple similarity matching results, where the multiple similarity matching results are obtained by performing, based on multiple consecutive frame images each including the first face and multiple consecutive video frame images each including the second face, similarity matching on the first face and the second face; and presenting, if it is determined that facial similarity conclusion represented by the plurality of similarity matching results is consistent, the facial similarity conclusion in the video duet interface through effect resources. That is, when presenting the similarity between the first face and the second face, if the similarity matching results of multiple frame images of the same user each including the first face and multiple consecutive video frame images each including the second face that are continuously collected are the same, it is determined that the similarity discrimination results are obtained stably, and the stable similarity matching result is presented.

According to the above embodiment of the present disclosure, similarity matching is performed on the collected frame image including the first face and the video frame image including the second face in the target video, to obtain a similarity matching result of the first face and the second face, and the similarity matching result of the first face and the second face is presented through effect resources. In addition, based on the similarity, it may be determined whether the matching object in the target video and the user have "Husband and wife" looks or "parent-child" looks, thereby improving the interaction, thus meeting the diverse demands of users, and achieving a good user experience.

Figure 6:
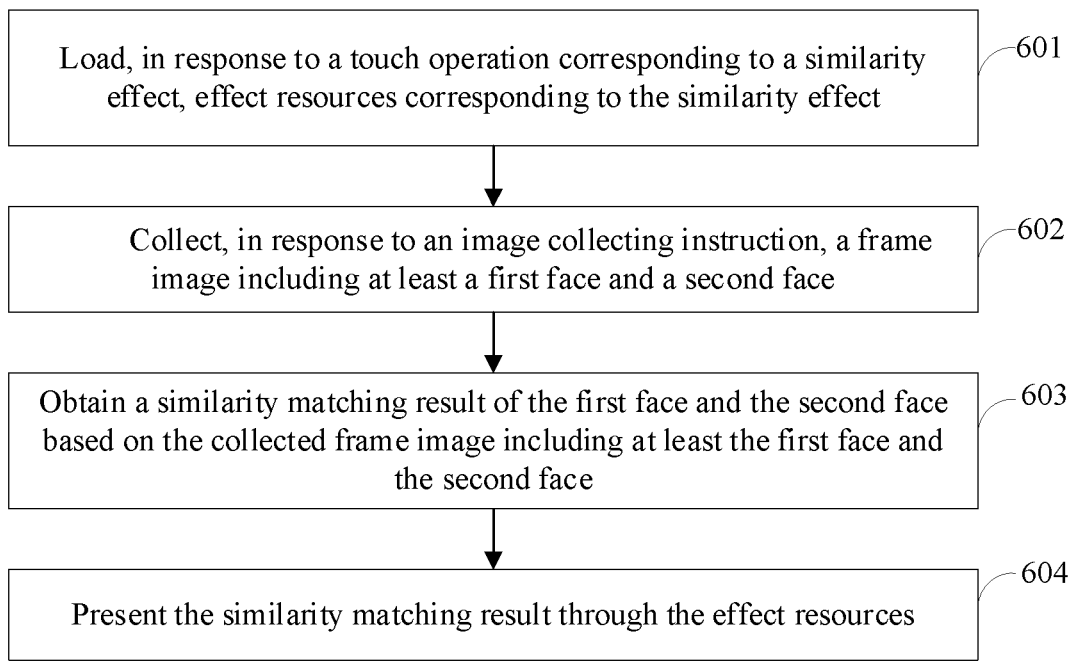
FIG. 6 is a schematic flowchart of a face image processing method according to an embodiment of the disclosure.

FIG. 6 is a schematic flowchart of a face image processing method according to an embodiment of the present disclosure. Referring to FIG. 6, the face image processing method according to an embodiment of the present disclosure includes the following steps 601 to 604.

In step 601, in response to a touch operation corresponding to a similarity effect, the terminal loads effect resources corresponding to the similarity effect.

In practice, the terminal is provided with clients, such as an instant messaging client, a Weibo client, a short video client. The user may perform social interaction by loading effect resources on the client. When the user touches a button for a similarity effect, the terminal loads the effect resources corresponding to the similarity effect in response to the touch operation corresponding to the similarity effect.

In some embodiments, before loading the effect resources corresponding to the similarity effect in response to the touch operation corresponding to the similarity effect, the terminal represents, in response to a duet instruction for a target video, a video duet interface including at least a first display window and a second display window. The first display window is used to display a frame image included in the target video, and the second display window is used to display a collected frame image including at least a first face and a second face.

In step 602, in response to an image collecting instruction, a frame image including at least a first face and a second face is obtained.

In practice, in a same-screen shooting scene, a user may trigger a shooting button on a user interface to trigger the terminal to shoot a video, and the terminal may collect the frame image including at least the first face and the second face.

In a video duet scene, the terminal collects a frame image including at least the first face and the second face in the second display window of the video duet interface. That is, in this case, a similarity between faces of multiples users that initiate duet may be detected, without detecting face data of the target video.

In step 603, a similarity matching result of the first face and the second face is obtained based on the collected frame image including at least the first face and the second face.

In practice, when the terminal recognizes that the collected frame image includes two faces, that is, the first face and the second face, in some embodiments, the terminal may obtain the similarity matching result of the first face and the first face in the following manner:

sending the collected frame image to a server, so that the server performs similarity matching on the first face and the second face based on the frame image including the first face and the second face, to obtain the similarity matching result; and receiving the similarity match result returned by the server.

In an actual implementation, the terminal sends the collected frame image including the first face and the second face to the server, and the server inputs the frame image including the first face and the second face into a trained neural network model, to perform face detection on the frame image including the first face and the second face, to obtain the corresponding first face image and second face image. Facial feature extraction is performed on the first face image and the second face image, to obtain facial features of the first face image and facial features of the second face image. Finally, similarity matching is performed on the facial features of the first face image and the facial features of the second face image, to obtain a similarity matching result, and the similarity matching result is returned to the terminal. In this way, the similarity matching operation between the first face and the second face is performed by the server, which reduces the data processing load on the terminal side, and is suitable for a case that the collected frame image including the first face and video frame image including the second face have large resolutions.

In some embodiments, the terminal may also obtain the similarity matching result of the first face and the second face in the following manner: obtaining, based on the frame image including the first face and the second face, the similarity matching result of the first face and the second face.

In an actual implementation, the terminal inputs the collected frame image including the first face and the second face into the trained neural network model, to perform face detection on the frame image including the first face and the second face, to obtain the first face image and second face image. Facial feature extraction is performed on the first face image and the second face image, to obtain the facial features of the first face image and the facial features of the second face image. Finally, similarity matching is performed on the facial features of the first face image and the facial features of the second face image, to obtain the similarity matching result. In this way, the similarity matching operation between the first face and the second face can be realized in real time on the terminal side, thereby improving the efficiency of obtaining the similarity matching result, thus improving the user experience.

In practice, when the terminal recognizes that the collected frame image includes multiple (more than two) faces, in some embodiments, the terminal obtains recognition information corresponding to the multiple faces, determines, based on the recognition information, the first face and the second face from the multiple faces, and presents a "smiley face" tag in each of the determined first face area and the second face area. The recognition information includes at least one of the following: a recognition sequence of multiple faces, a face integrity of multiple recognized faces.

In an actual implementation, the terminal inputs the collected frame image including multiple faces into the trained neural network model, to perform face detection on the frame images including multiple faces, to determine the first face image and the second face image. Facial feature extraction is performed on the first face image and the second face image, to obtain the facial features of the first face image and the facial features of the second face image. Finally, similarity matching is performed on the facial features of the first face image and the facial features of the second face image, to obtain the similarity matching result.

In step 604, the similarity matching result is presented through the effect resources.

Figure 7A:
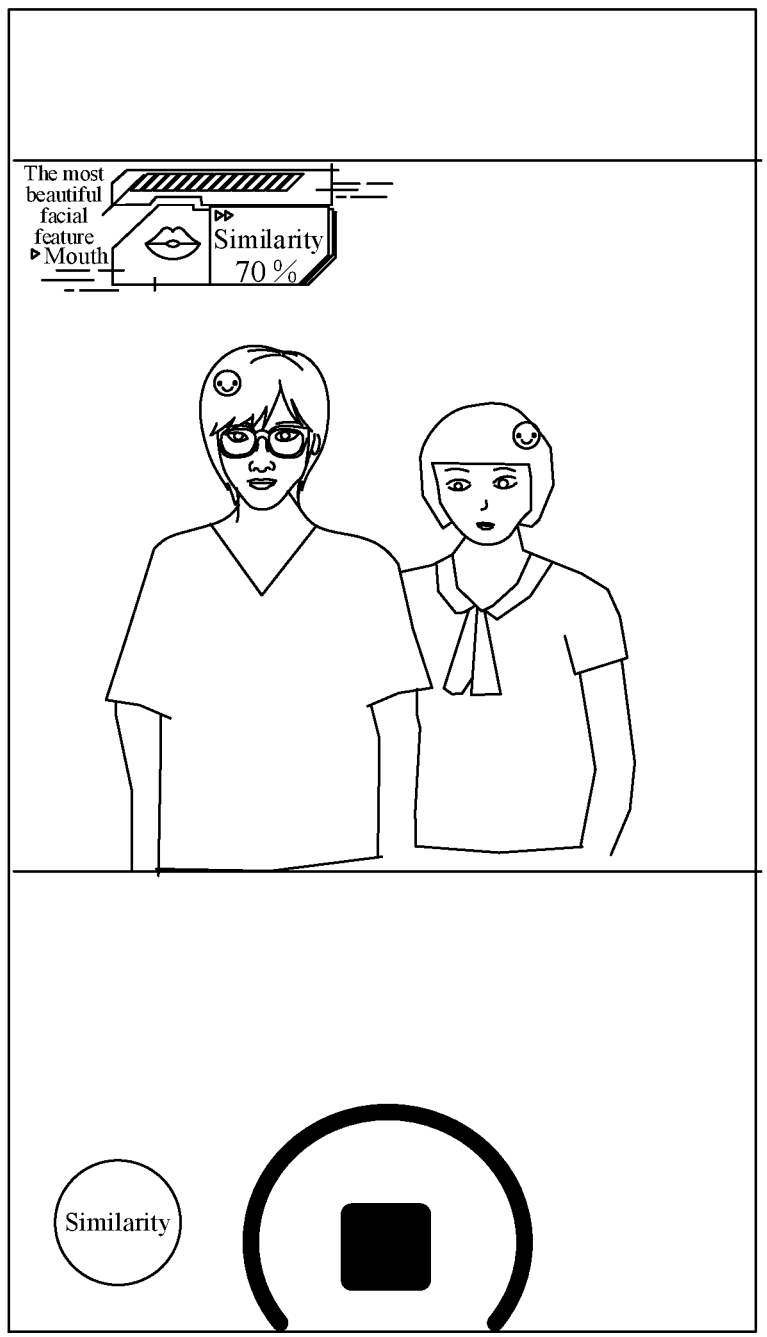
FIG. 7A is a schematic diagram of an interface for presenting a face similarity matching result according to an embodiment of the disclosure.
Figure 7B:
FIG. 7B is a schematic diagram of an interface for presenting a face similarity matching result according to an embodiment of the disclosure.

When the terminal recognizes that the collected frame image includes two faces, in some embodiments, for the overall similarity matching result of the facial features of the first face and the second face presented on the user interface and the most beautiful facial feature of the first face, referring to FIG. 7A, FIG. 7A is a schematic diagram of an interface for presenting a face similarity matching result according to an embodiment of the present disclosure. In FIG. 7A, the overall similarity between the first face and the second face is 70%, and the most beautiful facial feature of the first face is the mouth. In some other embodiments, the most similar facial feature of the first face and the second face and the corresponding similarity are presented in the user interface, referring to FIG. 7B, FIG. 7B is a schematic diagram of an interface for presenting a face similarity matching result according to an embodiment of the present disclosure. In FIG. 7B, the presented most similar facial feature of the first face and the second face is the mouth, and the similarity is 70%.

Figure 7C:
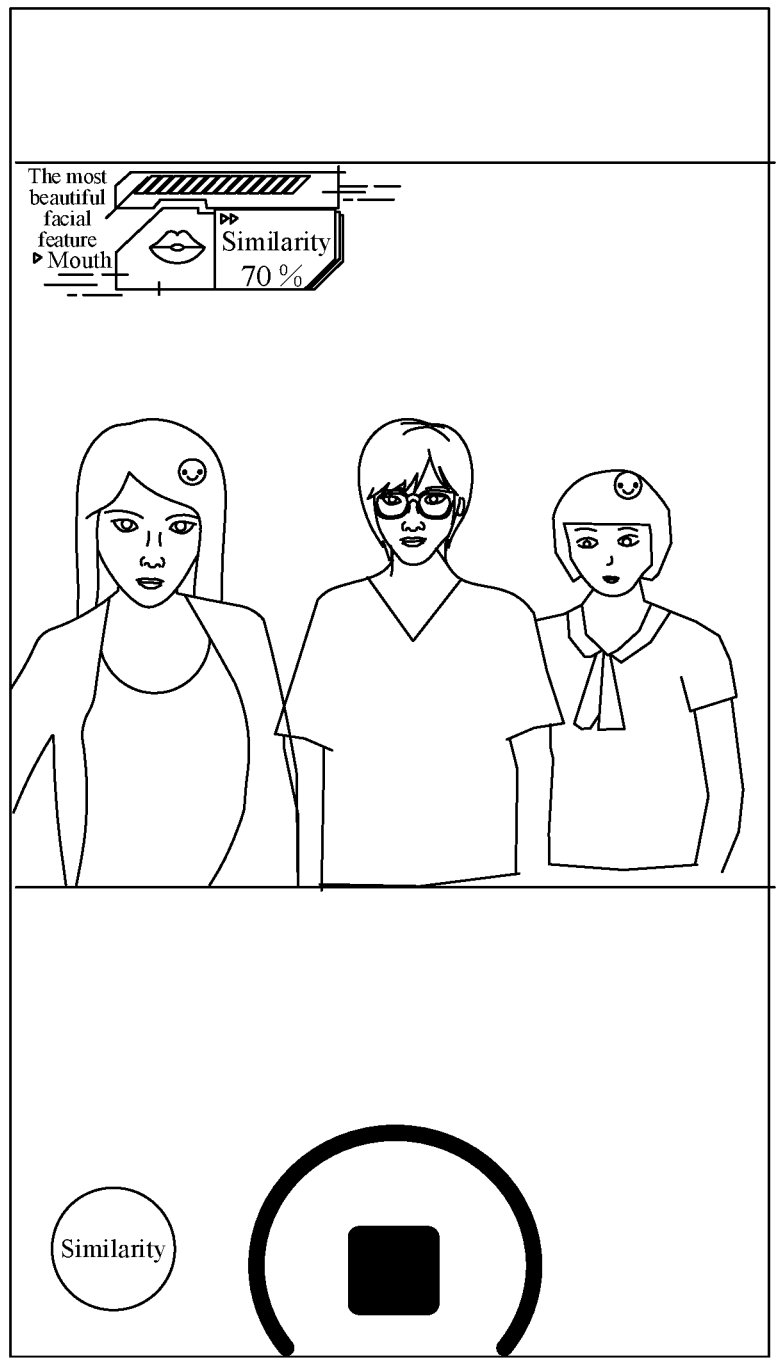
FIG. 7C is a schematic diagram of an interface for presenting a face similarity matching result according to an embodiment of the disclosure.

When the terminal recognizes that the collected frame image includes multiple (more than two) faces, in some embodiments, the similarity matching result between the selected first face and the second face is presented in the user interface, referring to FIG. 7C, FIG. 7C is a schematic diagram of an interface for presenting a face similarity matching result according to an embodiment of the present disclosure. In FIG. 7C, the presented overall similarity between the first face and the second face is 70%, and the most similar facial feature is the mouth.

Figure 7D:
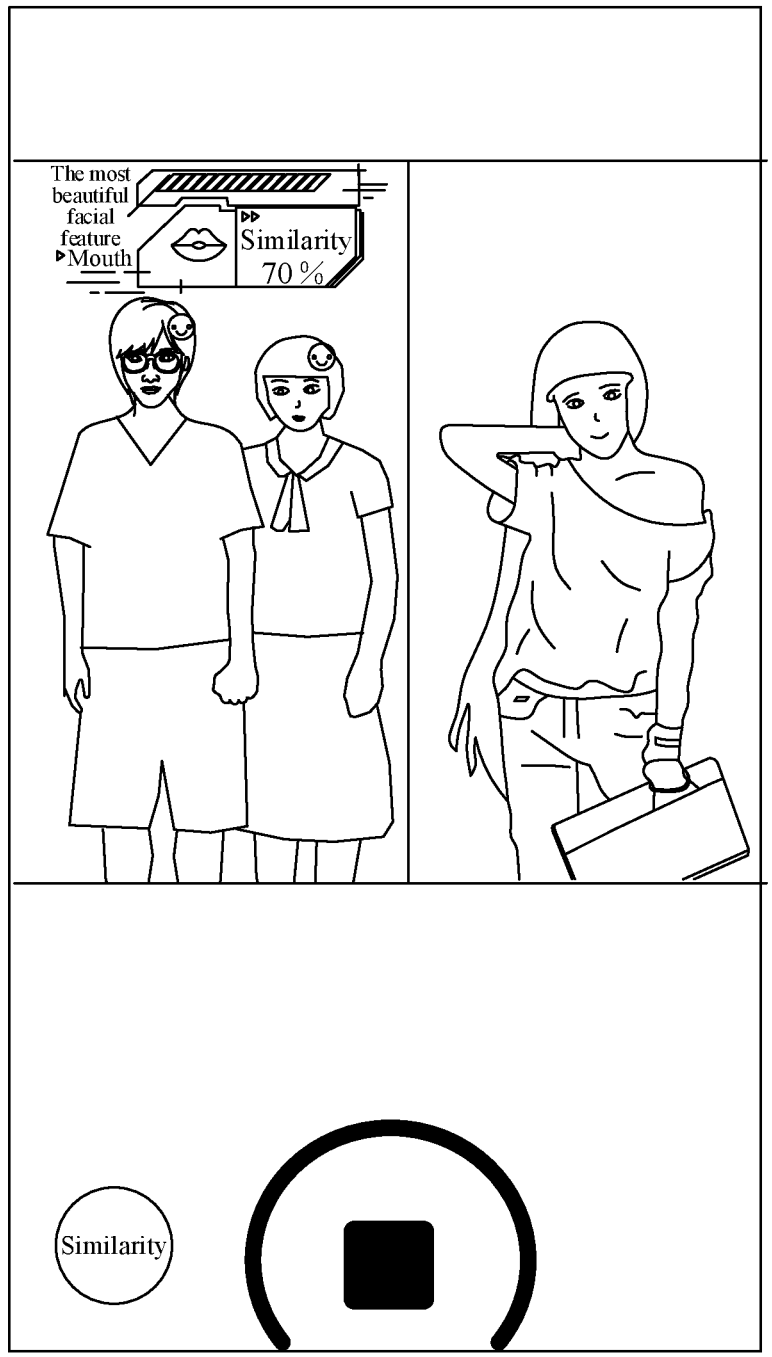
FIG. 7D is a schematic diagram of an interface for presenting a face similarity matching result according to an embodiment of the disclosure.

In a duet scene, in some embodiments, the similarity matching result of the first face and the second face in the collected frame image is presented in the user interface, referring to FIG. 7D, FIG. 7D is a schematic diagram of an interface for presenting a face similarity matching result according to an embodiment of the present disclosure. In FIG. 7D, the presented overall similarity between the first face and the second face is 75%, and the most similar facial feature is the mouth.

According to the above embodiments of the present disclosure, similarity matching is performed on the frame image including the first face and the second face, so that in the same-screen shooting scene and the duet scene, the similarity matching result of the first face and the second face in the collected frame image is presented through effect resources, thereby meeting the diverse demands of users, thus achieving a good user experience.

Figure 8:
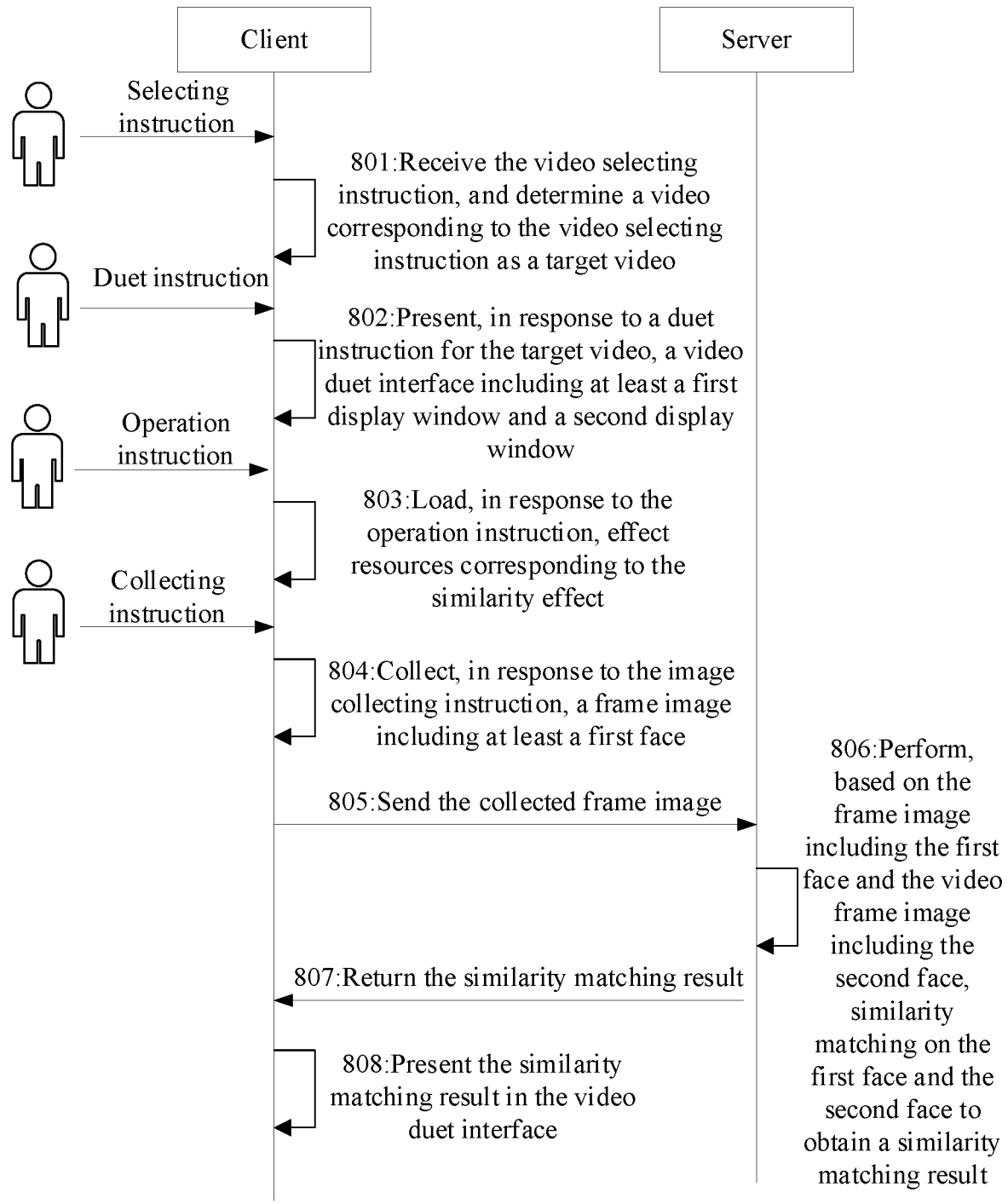
FIG. 8 is a schematic flowchart of a face image processing method according to an embodiment of the disclosure.

FIG. 8 is a schematic flowchart of a face image processing method according to an embodiment of the present disclosure. The face image processing method may be implemented by a client on a terminal and a server. Referring to FIG. 8, the face image processing method according to the embodiment of the present disclosure includes the following steps 801 to 808.

In step 801, the client receives a selecting instruction for a video, and determines a video corresponding to the video selecting instruction as a target video.

In practice, the client may be a social network client, such as a short video client, an instant messaging client, or may be an image processing client, such as a beauty camera client. The user opens the client, and multiple video information is presented on the user interface of the client. The user may select video information to be interacted with. The terminal receives a video selecting instruction for a video, and determines a video corresponding to the video selecting instruction as the target video.

Herein, the video information may include, for example, video cover information, text information associated with a video, such as a title, a video tag.

In step 802, in response to a duet instruction for the target video, the client presents a video duet interface including at least a first display window and a second display window.

In practice, on a user interface of the client where the selected target video is presented, the user may click a duet button on the user interface corresponding to the target video to trigger the duet instruction, and the client represents, in response to the duet instruction for the target video, the video duet interface as shown in FIG. 4A. The video duet interface in FIG. 4A includes a first display window, a second display window, effects and a shooting button, where the first display window displays a video shot by a client camera, the second display window displays the target video selected by the user, clicking the effect button may trigger the loading of the effect resources, long pressing the shooting button may trigger the camera to shoot a video.

In step 803, the client loads the effect resources corresponding to the similarity effect in response to the operation instruction.

In practice, an effect library on the client stores multiple effect types, such as big head, ancient identity test, most beautiful facial feature detection and similarity detection, and the user may select a desired effect type.

In step 804, in response to an image collecting instruction, the client collects a frame image including at least the first face.

In an actual implementation, the user triggers the shooting button on the user interface to trigger the terminal to shoot a video, and the terminal collects the frame image including at least the first face in real time.

In step 805, the client sends the collected frame image including the first face to a server.

In step 806, the server performs similarity matching on the first face and the second face based on the frame image including the first face and the video frame image including the second face to obtain a similarity matching result.

In an actual implementation, the client sends the collected frame image including the first face to the server. Since the target video is stored in the server, the server may extract, from the target video, a video frame image including a second face at the same time as the collected frame image. Then, the frame image including the first face and the video frame image including the second face are inputted into a trained neural network model, to perform face detection on the frame image including the first face and the frame image including the second face, to obtain the first face image and second face image. Then, facial feature extraction is performed on the first face image and the second face image to obtain facial features of the first face image and facial features of the second face image. Finally, similarity matching is performed on the facial features of the first face image and the facial features of the second face image, to obtain the similarity matching result.

It should be noted that, in practice, when the client recognizes that the collected frame image includes multiple faces, the client obtains recognition information corresponding to the multiple faces, and determines the first face from the multiple faces based on the recognition information, where the recognition information includes at least one of the following: the recognition sequence of multiple faces, and the face integrity of the multiple recognized faces. When the video frame image of the target video includes multiple faces, the server may determine the second face from the multiple faces based on the appearing order of the multiple faces in the target video.

In step 807, the server returns the obtained similarity matching result to the client.

In step 808, the client presents the similarity matching result in the video duet interface.

In an actual implementation, the similarity matching result of the first face and the second face is presented in the first display window and/or the second display window of the user interface of the client. In this way, when performing duet with the target video, the facial feature similarity between the user and the matching object in the target video may be determined based on the similarity matching result, thereby meeting the diverse demands of the user, thus achieving a good user experience.

Figure 9:
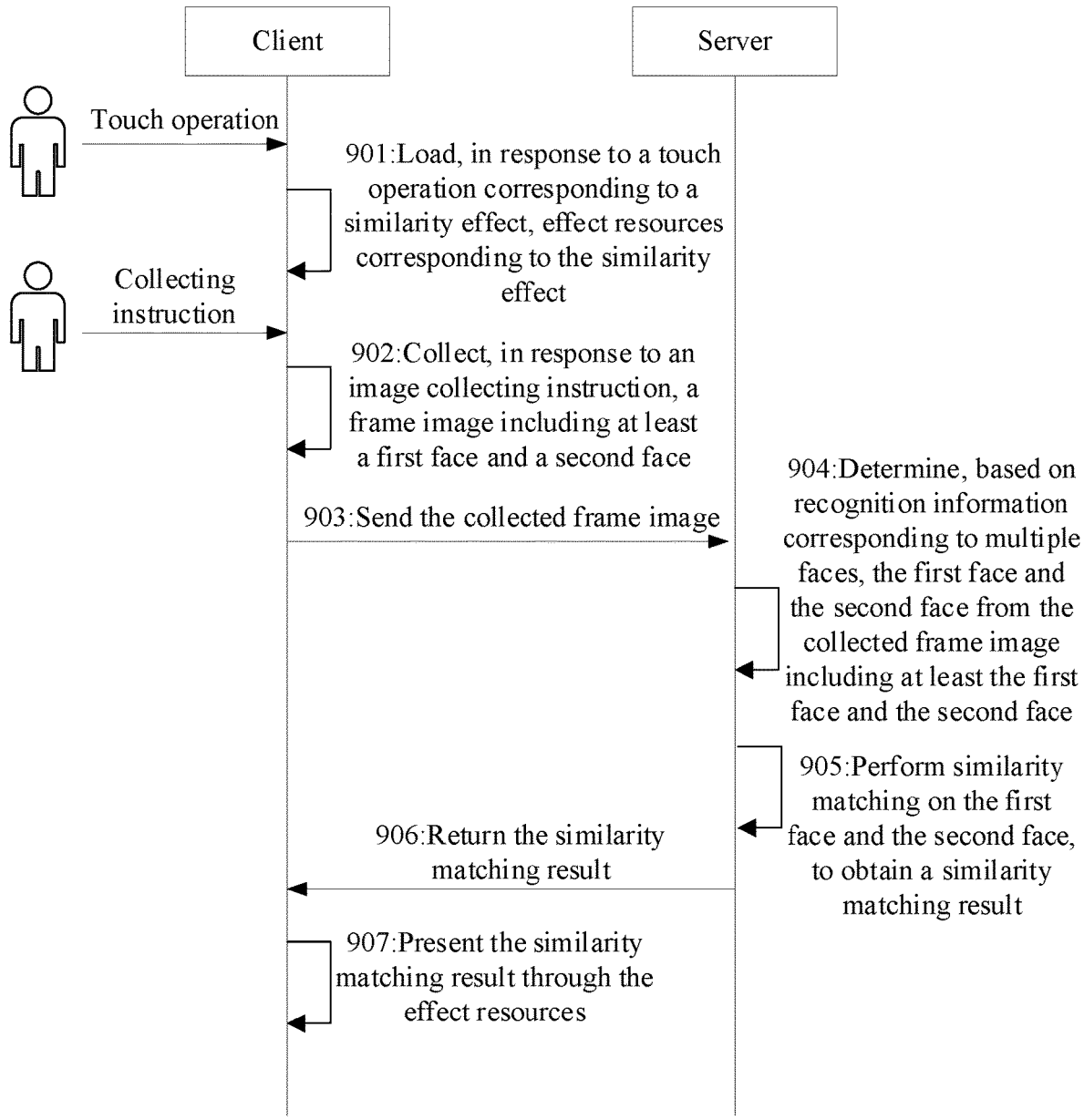
FIG. 9 is a schematic flowchart of a face image processing method according to an embodiment of the disclosure.

FIG. 9 is a schematic flowchart of a face image processing method according to an embodiment of the present disclosure. The face image processing method may be implemented by a client on a terminal and a server. Referring to FIG. 9, the face image processing method includes the following steps 901 to 907.

In step 901, in response to a touch operation corresponding to a similarity effect, the client loads effect resources corresponding to the similarity effect.

In practice, an effect library of the client stores multiple effect types. The user may perform social interaction by loading effect resources on the client. When the user touches a button for the similarity effect, the client loads, in response to the touch operation corresponding to the similarity effect, effect resources corresponding to the similarity effect.

In step 902, in response to an image collecting instruction, the client collects a frame image including at least the first face and the second face.

In practice, in the same-screen scenario, the user touches a shooting button on the user interface of the client to trigger the client to shoot a video, and the client may collect the frame image including at least the first face and the second face.

In step 903, the client sends the collected frame image to a server.

In step 904, the server determines the first face image and the second face image from the frame image including at least the first face and the second face based on recognition information corresponding to the multiple faces.

In practice, when the frame image collected by the client includes multiple faces, the server obtains the recognition information corresponding to the multiple faces, and determines the first face and the second face from the multiple faces based on the recognition information. The recognition information includes at least one of the following: a recognition sequence of multiple faces, and a face integrity of the multiple recognized faces. The server performs face detection on the determined frame image including the first face and the second face, to obtain the first face image and second face image.

In step 905, the server performs similarity matching on the first face image and the second face image to obtain a similarity matching result.

In an actual implementation, the server performs facial feature extraction on the first face image and the second face image to obtain facial features of the first face image and facial features of the second face image. Then, similarity matching is performed on the facial features of the first face image and the facial features of the second face image to obtain the similarity matching result. Herein, the similarity matching result may be an overall similarity matching result of the facial features between the first face and the second face, or a matching result of the most similar facial feature between the first face and the second face.

In step 906, the server returns the similarity matching result to the client.

In step 907, the client presents the similarity matching result through the effect resources.

Figure 10:
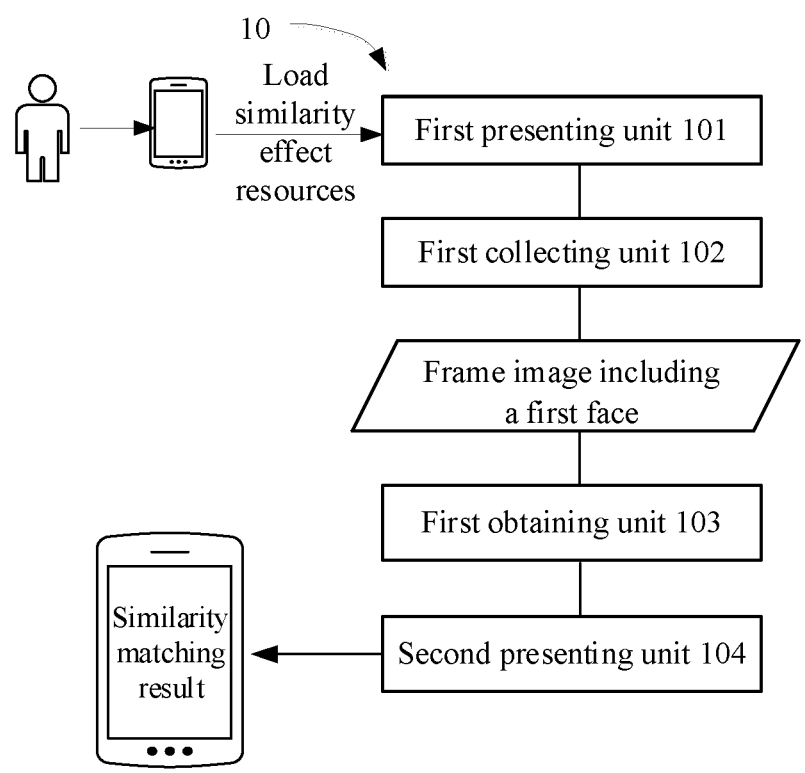
FIG. 10 is a schematic structural diagram of a face image processing device according to an embodiment of the disclosure.

Next, the software implementation of the face image processing device according to the embodiment of the present disclosure is described. FIG. 10 is a schematic structural diagram of a face image processing device according to an embodiment of the present disclosure. Referring to FIG. 10, the face image processing device 10 according to the embodiment of the present disclosure includes: a first presenting unit 101, a first collecting unit 102, a first obtaining unit 103, and a second presenting unit 104. The first presenting unit 101 is configured to present a video duet interface including at least a first display window and a second display window in response to a duet instruction for a target video. The first collecting unit 102 is configured to collect a frame image including at least a first face in response to an image collection instruction. The first display window is configured to display a video frame image of the target video including a second face, and the second display window is configured to display the frame image including at least the first face. The first obtaining unit 103 is configured to obtain a similarity matching result of the first face and the second face based on the frame image including the first face and the video frame image including the second face. The second presenting unit 104 is configured to present the similarity matching result in the video duet interface.

Figure 11:
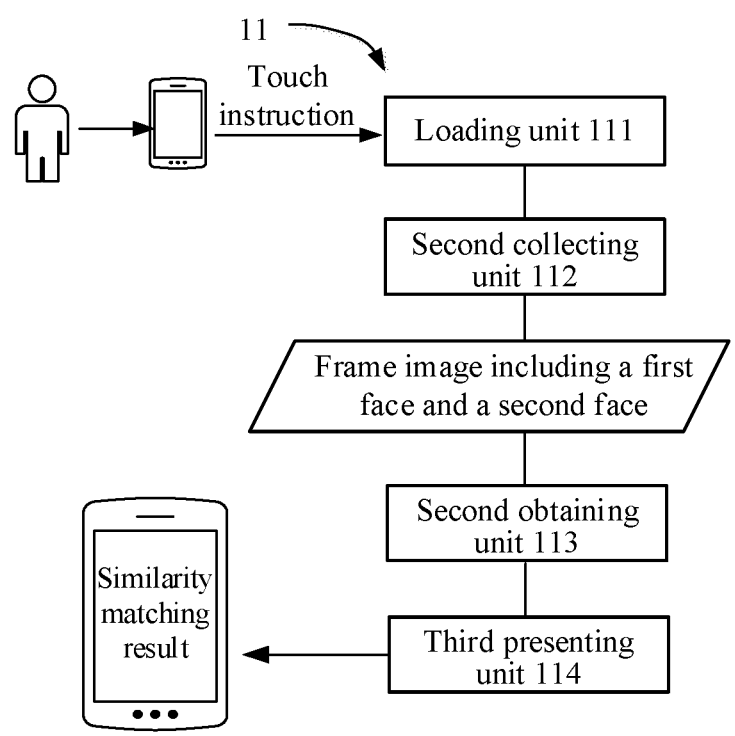
FIG. 11 is a schematic structural diagram of a face image processing device according to an embodiment of the disclosure.

FIG. 11 is a schematic structural diagram of a face image processing device according to an embodiment of the present disclosure. Referring to FIG. 11, the face image processing device 11 of the embodiment of the present disclosure includes: a loading unit 111, a second collecting unit 112, a second obtaining unit 113, and a third presenting unit 114. The loading unit 111 is configured to load effect resources corresponding to a similarity effect in response to a touch operation corresponding to the similarity effect. The second collecting unit 112 is configured to collect a frame image including at least a first face and a second face in response to an image collection instruction. The second obtaining unit 113 is configured to obtain a similarity matching result of the first face and the second face based on the collected frame image including at least the first face and the second face. The third presenting unit 114 is configured to present the similarity matching result through the effect resources.

A terminal is provided according to an embodiment of the present disclosure, including: a memory and a processor. The memory is configured to store executable instructions. The processor is configured to execute the executable instructions to implement the face image processing method according to the embodiments of the present disclosure.

A non-transitory storage medium is provided according to an embodiment of the present disclosure, storing executable instructions. The executable instructions, when executed, implement the face image processing method according to the embodiments of the present disclosure.

According to one or more embodiments of the present disclosure, a face image processing method is provided according to an embodiment of the present disclosure, including:
  presenting, in response to a duet instruction for a target video, a video duet interface including at least a first display window and a second display window;
  collecting, in response to an image collecting instruction, a frame image including at least a first face, where the first display window is configured to display a video frame image of the target video including a second face, and the second display window is configured to display the frame image including at least the first face;
  obtaining a similarity matching result of the first face and the second face based on the frame image including the first face and the video frame image including the second face; and
  presenting the similarity matching result in the video duet interface.

In some embodiments, before the collecting, in response to an image collecting instruction, a frame image including at least a first face, the method further includes:
  receiving an operation instruction corresponding to a similarity effect; and
  loading, in response to the operation instruction, effect resources corresponding to the similarity effect, where the presenting the similarity matching result in the video duet interface includes:
  presenting, through the effect resources, the similarity matching result in the video duet interface.

In some embodiments, the method further includes:
  presenting video information of at least one video in the user interface; and
  receiving, based on the presented video information of the at least one video, a video selecting instruction for the at least one video, and determining a video corresponding to the video selecting instruction as the target video.

In some embodiments, the obtaining a similarity matching result of the first face and the second face includes:
  sending the collected frame image to a server, where the server performs, based on the frame image including the first face and the video frame image including the second face, similarity matching on the first face and the second face, to obtain the similarity matching result; and
  receiving the similarity matching result returned by the server.

In some embodiments, the obtaining a similarity matching result of the first face and the second face includes:
  receiving a video file of the target video sent by a server;
  decoding the video file to obtain the video frame image including the second face; and
  performing, based on the frame image including the first face and the video frame image including the second face, similarity matching on the first face and the second face to obtain a similarity matching result.

In the above solution, the presenting the similarity matching result in the video duet interface includes:
  presenting, in the first display window and/or the second display window, a similarity matching result of overall facial features of the first face and the second face.

In some embodiments, the presenting the similarity matching result in the video duet interface includes:
  presenting, in the first display window and/or the second display window, a content of a facial feature with a highest similarity between the first face and the second face.

In some embodiments, the method further includes:
  obtaining, if it is recognized that the collected frame image includes multiple faces, recognition information corresponding to the multiple faces, where the recognition information includes at least one of the following: a recognition sequence of the multiple faces, and a face integrity of each of the multiple faces; and
  determining, based on the recognition information, the first face from the recognized multiple faces.

In some embodiments, the presenting the similarity matching result in the video duet interface includes:
  obtaining multiple similarity matching results, where the multiple similarity matching results are obtained by performing, based on multiple consecutive frame images each including a first face and multiple consecutive video frame images each including a second face, similarity matching on the first face and the second face; and
  presenting, if it is determined that facial similarity conclusion represented by the multiple similarity matching results is consistent, the facial similarity conclusion in the video duet interface.

A face image processing method is provided according to an embodiment of the present disclosure, including:
  loading, in response to a touch operation corresponding to a similarity effect, effect resources corresponding to the similarity effect;
  collecting, in response to an image collecting instruction, a frame image including at least a first face and a second face;
  obtaining a similarity matching result of the first face and the second face based on the collected frame image including at least the first face and the second face; and
  presenting the similarity matching result through the effect resources.

In some embodiments, before the loading, in response to a touch operation corresponding to a similarity effect, effect resources corresponding to the similarity effect, the method further includes:

presenting, in response to a duet instruction for a target video, a video duet interface including at least a first display window and a second display window, where the first display window displays a frame image included in the target video, and the second display window displays the collected frame image including at least the first face and the second face.

In some embodiments, the obtaining a similarity matching result of the first face and the second face based on the collected frame image including at least the first face and the second face includes:

sending the collected frame image including at least the first face and the second face to a server, where the server performs, based on the frame image including at least the first face and the second face, similarity matching on the first face and the second face, to obtain the similarity matching result; and receiving the similarity matching result returned by the server.

In some embodiments, the obtaining a similarity matching result of the first face and the second face based on the collected frame image including at least the first face and the second face includes:

performing, based on the collected frame image including at least the first face and the second face, similarity matching on the first face and the second face, to obtain the similarity matching result.

A face image processing device is provided according to an embodiment of the present disclosure, including:

a first presenting unit, configured to present, in response to a duet instruction for a target video, a video duet interface including at least a first display window and a second display window;

a first collecting unit, configured to collect, in response to an image collecting instruction, a frame image including at least a first face, where the first display window is configured to display a video frame image of the target video including a second face, and the second display window is configured to display the frame image including at least the first face;

a first obtaining unit, configured to obtain a similarity matching result of the first face and the second face based on the frame image including the first face and the video frame image including the second face; and a second presenting unit, configured to present the similarity matching result in the video duet interface.

In some embodiments, the device further includes a first loading unit. The first loading unit is configured to: receive an operation instruction corresponding to a similarity effect; and load, in response to the operation instruction, effect resources corresponding to the similarity effect. The second presenting unit is further configured to present, through the effect resources, the similarity matching result in the video duet interface.

In some embodiments, the device further includes a selecting unit. The selecting unit is configured to present video information of at least one video in a user interface; and receive, based on the presented video information of the at least one video, a video selecting instruction for the at least one video, and determining a video corresponding to the video selecting instruction as the target video.

In some embodiments, the first acquiring unit is further configured to: send the collected frame image to a server, where the server is configured to perform, based on the frame image including the first face and the video frame image including the second face, similarity matching on the first face and the second face, to obtain the similarity matching result; and receive the similarity matching result returned by the server.

In some embodiments, the first obtaining unit is further configured to receive a video file of the target video sent by the server; decode the video file to obtain the video frame image including the second face; and perform, based on the frame image including the first face and the video frame image including the second face, similarity matching on the first face and the second face to obtain a similarity matching result.

In some embodiments, the second presenting unit is further configured to present, in the first display window and/or the second display window, an overall similarity matching result of facial features between the first face and the second face.

In some embodiments, the second presenting unit is further configured to present, in the first display window and/or the second display window, a facial feature with a highest similarity between the first face and the second face.

In some embodiments, the device further includes a recognition unit. The recognition unit is configured to obtain, if it is recognized that the collected frame image includes multiple faces, recognition information corresponding to the multiple faces, where the recognition information includes at least one of the following: a recognition sequence of the multiple faces, and a face integrity of each of the multiple faces; and determine, based on the recognition information, the first face from the multiple faces.

In some embodiments, the second presenting unit is further configured to obtain multiple similarity matching results, where the multiple similarity matching results are obtained by performing, based on multiple consecutive frame images each including a first face and multiple consecutive video frame images each including a second face, similarity matching on the first face and the second face; and present, if it is determined that facial similarity conclusion represented by the multiple similarity matching results is consistent, the facial similarity conclusion in the video duet interface.

A face image processing device is provided according to an embodiment of the present disclosure, including:

a loading unit, configured to load, in response to a touch operation corresponding to a similarity effect, effect resources corresponding to the similarity effect;

a second collecting unit, configured to collect, in response to an image collecting instruction, a frame image including at least a first face and a second face;

a second obtaining unit, configured to obtain a similarity matching result of the first face and the second face based on the collected frame image including at least the first face and the second face; and a third presenting unit, configured to present the similarity matching result through the effect resources.

In some embodiments, the device further includes a fourth presenting unit, and the fourth presenting unit is arranged in front of the loading unit. The fourth presenting unit is configured to present, in response to a duet instruction for a target video, a video duet interface including at least a first display window and a second display window. The first display window is configured to display a frame image included in the target video, and the second display window is configured to display the collected frame image including at least the first face and the second face.

In some embodiments, the second obtaining unit is further configured to send the collected frame image including at least the first face and the second face to a server, where the server is configured to perform, based on the frame image including at least the first face and the second face, similarity matching on the first face and the second face, to obtain the similarity matching result; and receive the similarity matching result returned by the server.

In some embodiments, the second obtaining unit is further configured to perform, based on the collected frame image including at least the first face and the second face, similarity matching on the first face and the second face, to obtain the similarity matching result.

The above described are only the embodiments of the present disclosure, and are not used to limit the protection scope of the present disclosure. Any modification, equivalents and improvement made within the spirit and scope of the present disclosure should fall in the protection scope of the present disclosure.

What is claimed is:

1. A face image processing method, comprising:
    playing a target video on an interface, wherein the target video is a pre-stored video, and wherein the interface comprises a duet button;
    in response to receiving a selection of the duet button, displaying a video duet interface, wherein the video duet interface simultaneously displays a first display window and a second display window, and wherein the video duet interface comprises an effect button;
    displaying the target video in the first display window and displaying a live camera feed in the second display window;
    loading effect resources corresponding to a similarity effect in response to receiving user input performed on the effect button;
    determining that a first face is displayed in the live camera feed and a second face is displayed in the target video in response to selecting the similarity effect;
    obtaining a similarity matching result of the first face and the second face based on a frame image comprising the first face and a video frame image comprising the second face;
    determining similarity degrees of corresponding facial features in the first face and the second face based on the similarity matching result; and
    presenting, on the video duet interface, a most similar facial feature among the corresponding facial features and a similarity degree of the most similar facial feature through the effect resources during the display of the target video in the first display window and the live camera feed in the second display window.

2. The method according to claim 1, further comprising:
    receiving an operation instruction corresponding to a similarity effect; and
    loading, in response to the operation instruction, effect resources corresponding to the similarity effect, wherein
    the presenting the similarity matching result in the video duet interface comprises:
    presenting, through the effect resources, the similarity matching result in the video duet interface.

3. The method according to claim 1, further comprising:
    presenting video information of at least one video in a user interface; and
    receiving, based on the presented video information of the at least one video, a video selecting instruction for the at least one video, and determining a video corresponding to the video selecting instruction as the target video.

4. The method according to claim 1, wherein the obtaining a similarity matching result of the first face and the second face comprises:
    sending the frame image comprising the first face to a server, wherein the server performs, based on the frame image comprising the first face and the video frame image comprising the second face, similarity matching on the first face and the second face, to obtain the similarity matching result; and
    receiving the similarity matching result returned by the server.

5. The method according to claim 1, wherein the obtaining a similarity matching result of the first face and the second face comprises:
    receiving a video file of the target video sent by a server;
    decoding the video file to obtain the video frame image comprising the second face; and
    performing, based on the frame image comprising the first face and the video frame image comprising the second face, similarity matching on the first face and the second face to obtain a similarity matching result.

6. The method according to claim 1, wherein the presenting the similarity matching result in the video duet interface during the display of the target video in the first display window and the live camera feed in the second display window comprises:
    presenting, in the first display window and/or the second display window, an overall similarity matching result of facial features between the first face and the second face.

7. The method according to claim 1, wherein the presenting the similarity matching result in the video duet interface during the display of the target video in the first display window and the live camera feed in the second display window comprises:
    presenting, in the first display window and/or the second display window, a facial feature with a highest similarity between the first face and the second face.

8. The method according to claim 1, further comprising:
    obtaining, if it is recognized that the frame image comprising the first face comprises a plurality of faces, recognition information corresponding to the plurality of faces, wherein the recognition information comprises at least one of the following: a recognition sequence of the plurality of faces, and a face integrity of each of the recognized plurality of faces; and
    determining, based on the recognition information, the first face from the plurality of faces.

9. The method according to claim 1, wherein the presenting the similarity matching result in the video duet interface during the display of the target video in the first display window and the live camera feed in the second display window comprises:
    obtaining a plurality of similarity matching results, wherein the plurality of similarity matching results are obtained by performing, based on a plurality of consecutive frame images each comprising a first face and a plurality of consecutive video frame images each comprising a second face, similarity matching on the first face and the second face; and
    presenting, if it is determined that facial similarity conclusion represented by the plurality of similarity matching results is consistent, the facial similarity conclusion in the video duet interface.

10. A terminal device, comprising:
    at least one processor; and at least one memory communicatively coupled to the at least one processor and storing instructions that upon execution by the at least one processor cause the terminal device to:
play a target video on an interface, wherein the target video is a pre-stored video, and wherein the interface comprises a duet button;
in response to receiving a selection of the duet button, displaying a video duet interface, wherein the video duet interface simultaneously displays a first display window and a second display window, and wherein the video duet interface comprises an effect button;
display the target video in the first display window and displaying a live camera feed in the second display window;
load effect resources corresponding to a similarity effect in response to receiving user input performed on the effect button;
determine that a first face is displayed in the live camera feed and a second face is displayed in the target video in response to selecting the similarity effect;
obtain a similarity matching result of the first face and the second face based on a frame image comprising the first face and a video frame image comprising the second face;
determine similarity degrees of corresponding facial features in the first face and the second face based on the similarity matching result; and
present, on the video duet interface, a most similar facial feature among the corresponding facial features and a similarity degree of the most similar facial feature through the effect resources during the display of the target video in the first display window and the live camera feed in the second display window.

11. A non-transitory storage medium, bearing computer-readable instructions that upon execution on a computing device cause the computing device at least to:
play a target video on an interface, wherein the target video is a pre-stored video, and wherein the interface comprises a duet button;
in response to receiving a selection of the duet button, displaying a video duet interface, wherein the video duet interface simultaneously displays a first display window and a second display window, and wherein the video duet interface comprises an effect button;
display the target video in the first display window and displaying a live camera feed in the second display window;
load effect resources corresponding to a similarity effect in response to receiving user input performed on the effect button;
determine that a first face is displayed in the live camera feed and a second face is displayed in the target video in response to selecting the similarity effect;
obtain a similarity matching result of the first face and the second face based on a frame image comprising the first face and a video frame image comprising the second face;
determine similarity degrees of corresponding facial features in the first face and the second face based on the similarity matching result; and
present, on the video duet interface, a most similar facial feature among the corresponding facial features and a similarity degree of the most similar facial feature through the effect resources during the display of the target video in the first display window and the live camera feed in the second display window.

12. The terminal device of claim 10, the at least one memory further storing instructions that upon execution by the at least one processor cause the terminal device to:
receive an operation instruction corresponding to a similarity effect; and
load, in response to the operation instruction, effect resources corresponding to the similarity effect, wherein
the presenting the similarity matching result in the video duet interface comprises:
present, through the effect resources, the similarity matching result in the video duet interface.

13. The terminal device of claim 10, the at least one memory further storing instructions that upon execution by the at least one processor cause the terminal device to:
present video information of at least one video in a user interface; and
receive, based on the presented video information of the at least one video, a video selecting instruction for the at least one video, and determining a video corresponding to the video selecting instruction as the target video.

14. The terminal device of claim 10, the at least one memory further storing instructions that upon execution by the at least one processor cause the terminal device to:
send the frame image comprising the first face to a server, wherein the server performs, based on the frame image comprising the first face and the video frame image comprising the second face, similarity matching on the first face and the second face, to obtain the similarity matching result; and
receive the similarity matching result returned by the server.

15. The terminal device of claim 10 the at least one memory further storing instructions that upon execution by the at least one processor cause the terminal device to:
receive a video file of the target video sent by a server;
decode the video file to obtain the video frame image comprising the second face; and
perform, based on the frame image comprising the first face and the video frame image comprising the second face, similarity matching on the first face and the second face to obtain a similarity matching result.

16. The terminal device of claim 10, the at least one memory further storing instructions that upon execution by the at least one processor cause the terminal device to:
present, in the first display window and/or the second display window, an overall similarity matching result of facial features between the first face and the second face.

17. The terminal device of claim 10, the at least one memory further storing instructions that upon execution by the at least one processor cause the terminal device to:
present, in the first display window and/or the second display window, a facial feature with a highest similarity between the first face and the second face.

18. The terminal device of claim 10, the at least one memory further storing instructions that upon execution by the at least one processor cause the terminal device to:
obtain if it is recognized that the frame image comprising the first face comprises a plurality of faces, recognition information corresponding to the plurality of faces, wherein the recognition information comprises at least one of the following: a recognition sequence of the plurality of faces, and a face integrity of each of the recognized plurality of faces; and
determine, based on the recognition information, the first face from the plurality of faces.

19. The terminal device of claim 10, the at least one memory further storing instructions that upon execution by the at least one processor cause the terminal device to:

obtain a plurality of similarity matching results, wherein the plurality of similarity matching results are obtained by performing, based on a plurality of consecutive frame images each comprising a first face and a plurality of consecutive video frame images each comprising a second face, similarity matching on the first face and the second face; and present, if it is determined that facial similarity conclusion represented by the plurality of similarity matching results is consistent, the facial similarity conclusion in the video duet interface.

* * * * *